(12) United States Patent
Yamashita et al.

(10) Patent No.: US 8,629,897 B2
(45) Date of Patent: Jan. 14, 2014

(54) IMAGE PROCESSING DEVICE, IMAGE PROCESSING METHOD, AND PROGRAM

(75) Inventors: Noriyuki Yamashita, Tokyo (JP); Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 12/880,234

(22) Filed: Sep. 13, 2010

(65) Prior Publication Data

US 2011/0058014 A1    Mar. 10, 2011

(30) Foreign Application Priority Data

Oct. 9, 2009 (JP) ............................... P2009-235401

(51) Int. Cl.
*H04N 7/00* (2011.01)

(52) U.S. Cl.
USPC .......................................................... 348/36

(58) Field of Classification Search
USPC .......................................................... 348/36
See application file for complete search history.

(56) References Cited

U.S. PATENT DOCUMENTS

| | | | |
|---|---|---|---|
| 6,677,981 B1 * | 1/2004 | Mancuso et al. ................. | 348/36 |
| 2002/0140829 A1 * | 10/2002 | Colavin et al. ........... | 348/231.99 |
| 2003/0117488 A1 * | 6/2003 | Pierce et al. .................... | 348/48 |
| 2005/0099494 A1 * | 5/2005 | Deng et al. ....................... | 348/36 |
| 2006/0018547 A1 * | 1/2006 | Ouchi ............................ | 382/190 |
| 2009/0208062 A1 * | 8/2009 | Sorek et al. .................... | 382/107 |

FOREIGN PATENT DOCUMENTS

JP          3168443          3/2001

* cited by examiner

*Primary Examiner* — Lynn Feild
*Assistant Examiner* — Lin Liu
(74) *Attorney, Agent, or Firm* — Finnegan, Henderson, Farabow, Garrett & Dunner, L.L.P.

(57) ABSTRACT

An imaging processing device includes: a position information generation section that generates position information which represents a relative positional relationship of captured images when the captured images are aligned on a predetermined plane so as to overlap same subjects, which are included in the different captured images, with each other; a strip image generation section that cuts out an area on each captured image from a predetermined reference position on the captured image to the reference position on another captured image which is aligned on the plane so as to overlap with the captured image and generates a strip image including the area, when the captured images are aligned on the plane on the basis of the position information; and a panoramic image generation section that generates a single panoramic image by aligning and stitching the strip images which are obtained from the captured images.

13 Claims, 17 Drawing Sheets

IMAGE PROCESSING DEVICE, IMAGE PROCESSING METHOD, AND PROGRAM

BACKGROUND OF THE INVENTION

1. Field of the Invention

The present invention relates to an image processing device, an imaging processing method, and a program. In particular, the invention relates to an image processing device and an image processing method, which are capable of motion of a subject on a panoramic image, and a program therefor.

2. Description of the Related Art

In recent years, as digital still cameras have become popular, the number of users who take large numbers of photos has increased. Also, there is demand for a method of effectively showing a large number of captured photos.

For example, as methods of effectively showing captured photos, methods using so-called panoramic image have been known. The panoramic image is one still image obtained by aligning a plurality of still images, which is obtained by image capturing of an image capturing apparatus while the apparatus is panned in a predetermined direction, so as to overlap same subjects on the still images with each other (for example, refer to Japanese Patent No. 3168443).

By using the methods using the panoramic image, it is possible to display a range of space, which is larger than the image capturing area (angle of view) of one still image taken by a normal image capturing apparatus, as a subject. Therefore, it is possible to more effectively display the captured image of the subject.

SUMMARY OF THE INVENTION

Incidentally, when a plurality of still images is captured while an image capturing apparatus is panned in order to obtain the panoramic image, sometimes several still images may include the same subject. In this case, the same subject in the different still images is a subject for which images are captured at mutually different times. Hence, it can be said that a still image group captured in order to generate a panoramic image has information on motion of the subject.

As it is, in the above-mentioned panoramic image, it is difficult to represent the motion of the subject included in the panoramic image. For this reason, it is hard to say that the captured image of the subject is displayed in a sufficiently effective way.

In view of the above-mentioned situation, the invention addresses the issue of more effectively displaying the captured image of the subject.

An imaging processing device according to an embodiment of the invention includes: position information generation means for, on the basis of a plurality of captured images which are obtained by image capturing of image capturing means while the image capturing means is moved, generating position information which represents a relative positional relationship of the captured images when the plurality of the captured images are aligned on a predetermined plane so as to overlap with each other same subjects which are included in the different captured images, strip image generation means for, for each of the plurality of the captured images, cutting out an area on the captured image from a predetermined reference position on the captured image to the reference position on another captured image which is aligned on the plane so as to overlap with the captured image and generating a strip image including the area, when the plurality of the captured images are aligned on the plane on the basis of the position information; and panoramic image generation means for generating one panoramic image by aligning and stitching the strip images which are obtained from the plurality of captured images. The strip image generation means generates a plurality of strip images from the captured images while shifting the areas on the captured images in a predetermined direction relative to the plurality of the captured images. The panoramic image generation means generates an image group formed of a plurality of the panoramic images, in which an area on an image capturing space set as an image capturing target at the time of the image capturing for obtaining the plurality of the captured images is displayed, by generating the panoramic image for each position of the area.

It is preferable that the same area on the image capturing space should be displayed in each of the plurality of the panoramic images.

It is preferable that the image processing device should further include display control means for sequentially displaying the plurality of the panoramic images at a predetermined time interval.

It is preferable that the image processing device should further include: specifying means for, when a moving subject on the panoramic image is designated, specifying the captured image including the moving subject among the plurality of the captured images; and cut-out-image generation means for, for each of the plurality of the captured images specified by the specifying means, forming a cut-out image by cutting out an area including the moving subject from the captured image, and generating a group of a plurality of cut-out images. It is also preferable that the display control means should sequentially display the plurality of the cut-out images at a predetermined time interval.

It is preferable that the image processing device should further include detection means for, on the basis of the panoramic images successively displayed, detecting the moving subject from the panoramic images. It is also preferable that the display control means should display the area including the moving subject in each panoramic image in a different display format from the other area when sequentially displaying the plurality of the panoramic images.

It is preferable that the plurality of the panoramic images should be images in which each area in a predetermined range on the image capturing space is displayed in order from one end to the other end of the area in the predetermined range when the panoramic images are sequentially displayed.

It is preferable that, by use of a plurality of block areas set on the captured images in advance, the position information generation means should generate the position information by respectively searching block correspondence areas corresponding to the plurality of the block areas from captured images obtained at an earlier time than the captured images.

It is preferable that the position information generation means should detect the block area including a moving subject on the basis of a relative positional relationship of the plurality of the block areas and a relative positional relationship of a plurality of the block correspondence areas, and when the block area including the moving subject is detected, should generate the position information by searching the block correspondence areas by use of the block areas, which are different from the detected block area, among the plurality of the block areas.

An image processing method or a program according to another embodiment of the invention includes: a position information generation step of, on the basis of a plurality of captured images which are obtained by image capturing of image capturing means while the image capturing means is moved, generating position information which represents a relative positional relationship of the captured images when the plurality of the captured images are aligned on a predetermined plane so as to overlap same subjects, which are included in the different captured images, with each other; a strip image generation step of, for each of the plurality of the captured images, cutting out an area on the captured image from a predetermined reference position on the captured image to the reference position on another captured image which is aligned on the plane so as to overlap with the captured image and generating a strip image including the area, when the plurality of the captured images are aligned on the plane on the basis of the position information; and a panoramic image generation step of generating one panoramic image by aligning and stitching the strip images which are obtained from the plurality of the captured images. In the strip image generation step, a plurality of the strip images are generated from the captured images while the areas on the captured images are shifted in a predetermined direction relative to the plurality of the captured images. In the panoramic image generation step, an image group formed of a plurality of the panoramic images, in which an area on an image capturing space set as an image capturing target at the time of the image capturing for obtaining the plurality of the captured images is displayed, is generated by generating the panoramic image for each position of the area.

In the embodiment of the invention, on the basis of the plurality of captured images which are obtained by the image capturing of the image capturing means while the image capturing means is moved, the position information, which represents the relative positional relationship of the captured images when the plurality of the captured images are aligned on the predetermined plane, is generated so as to overlap the same subjects, which are included in the different captured images, with each other. Then, for each of the plurality of the captured images, when the plurality of the captured images are aligned on the plane on the basis of the position information, the area on the captured image is cut out from the predetermined reference position on the captured image to the reference position on another captured image which is aligned on the plane so as to overlap with the captured image, thereby generating the strip image including the area. Subsequently, a single panoramic image is generated by aligning and stitching the strip images which are obtained from the plurality of the captured images. At this time, the plurality of the strip images is generated from the captured images while the areas on the captured images are shifted in the predetermined direction relative to the plurality of the captured images, and the image group formed of the plurality of the panoramic images, in which an area on the image capturing space set as an image capturing target at the time of the image capturing for obtaining the plurality of the captured images is displayed, is generated by generating the panoramic image for each position of the area.

According to the embodiments of the invention, it is possible to more effectively display the captured image of the subject.

DESCRIPTION OF THE PREFERRED EMBODIMENTS

Hereinafter, an embodiment of the invention will be described with reference to the accompanying drawings.
Description of Panoramic Motion Image An image capturing apparatus according to the embodiment of the invention is, for example, a camera or the like, and generates one panoramic motion image from a plurality of captured images successively obtained by the image capturing apparatus in a state where the image capturing apparatus is moving.

The panoramic motion image is an image group formed of a plurality of panoramic images in which an area larger than an image capturing area (angle of view) capable of being taken by one image capturing of the image capturing apparatus on the real space is displayed as a subject. Accordingly, the panoramic motion image may be defined as one motion image when each panoramic image constituting the panoramic motion image is taken as an image corresponding to one frame, and may be defined as a still image group when each panoramic image constituting the panoramic motion image is taken as one still image. Hereinafter, for convenience of description, in the following description, it is assumed that the panoramic motion image is a motion image.

When a user intends to make the image capturing apparatus generate a panoramic motion image, the user captures images used in the generation of the panoramic motion image by operating the image capturing apparatus.

Figure 1:
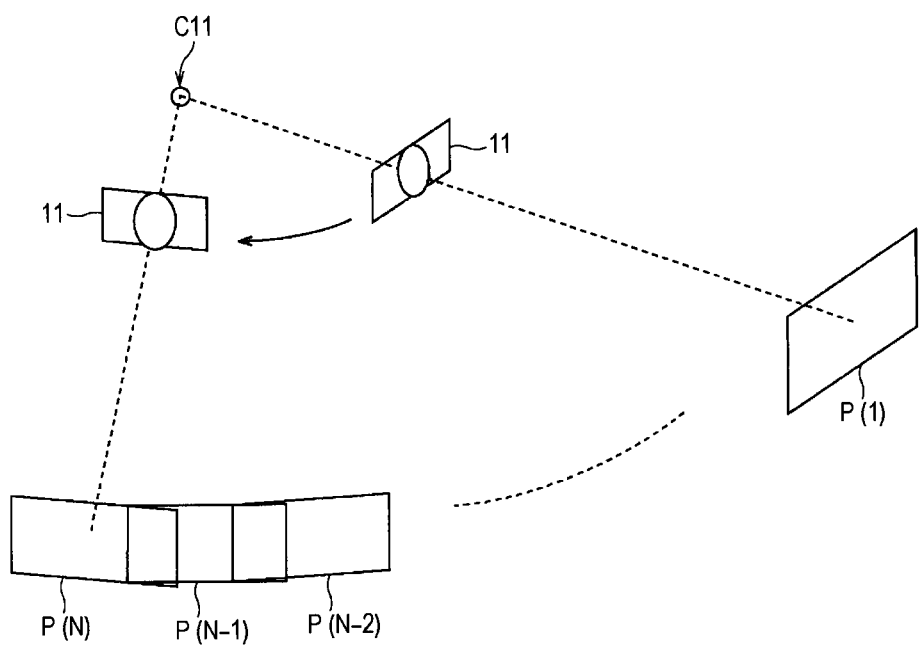
FIG. 1 is a diagram illustrating a method of capturing images.

For example, as shown in FIG. 1, at the time of the image capturing for obtaining captured images, the user successively captures images of a subject frontward, in the drawing, while rotating (panning) the optical lens of the image capturing apparatus 11 about the rotation center C11 in a direction from the right side of the drawing to the left side thereof. At this time, the user adjusts the rotation speed of the image capturing apparatus 11 so that the same subject which remains stationary is included in a plurality of captured images.

As described above, by capturing images while moving the image capturing apparatus 11, it is possible to obtain N captured images P(1) to P(N).

Here, the captured image P(1) is an image which is the oldest image of the N captured images in order of the image capture time, that is, an image which is captured first. In addition, the captured image P(N) is an image which is the most recent image of the N captured images in order of the image capture time, that is, an image which is captured last. Hereinafter, n-th captured image (here, 1≤n≤N) is referred to as a captured image P(n).

In addition, each captured image may be a still image which is successively photographed, and may be an image corresponding to one frame of the photographed motion image.

Further, in FIG. 1, capturing images in a state where the image capturing apparatus 11 itself is rotated by 90 degrees, that is, capturing images in a state where the image capturing apparatus 11 is turned sideways may be advantageous to obtain longer captured images in the vertical direction of the drawing. In this case, image capturing for obtaining the captured images may be performed with the image capturing apparatus 11 turned sideways. At this time, the captured image is rotated by 90 degrees in the same direction as the image capturing apparatus 11, and the panoramic motion image is generated.

In such a manner, when the N captured images are obtained, the image capturing apparatus 11 generates and displays the panoramic motion image by using the captured images. Here, the panoramic motion image is a motion image in which the entire area on the image capturing space as the image capturing target is displayed as a subject at the time of the image capturing for obtaining the N captured images.

Figure 2:
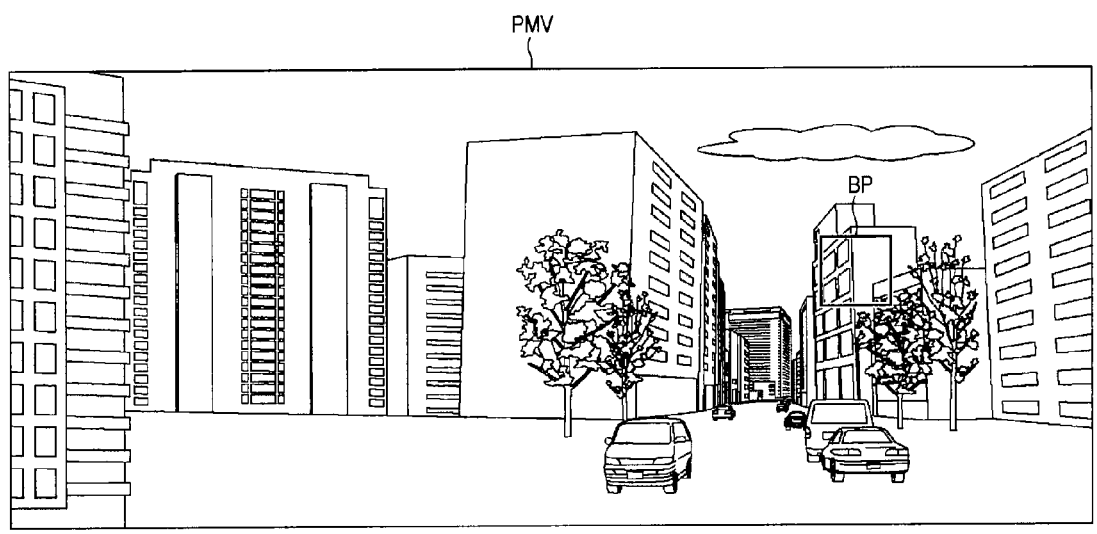
FIG. 2 is a diagram illustrating a display example of a panoramic motion image.

When the panoramic motion image is generated, for example, the image capturing apparatus 11 displays the panoramic motion image PMV shown in FIG. 2. By designating a predetermined area on the displayed panoramic motion image PMV, the user can display a new motion image further relating to the designated area.

For example, when the user designates an optional position on the panoramic motion image PMV, the image capturing apparatus 11 displays a partial panoramic motion image in which only the area BP, centered on the designated position, on the panoramic motion image PMV is set as a subject. That is, a process of displaying the partial panoramic motion image is a process of displaying a partial area of the panoramic motion image in an enlarged manner.

Further, the user can display a pan motion image on which a partial area on the panoramic motion image PMV is panned and displayed, and can also display a subject-tracking motion image on which only the area of a predetermined moving subject is continuously displayed in an enlarged manner.

Configuration of Image Capturing Apparatus

Figure 3:
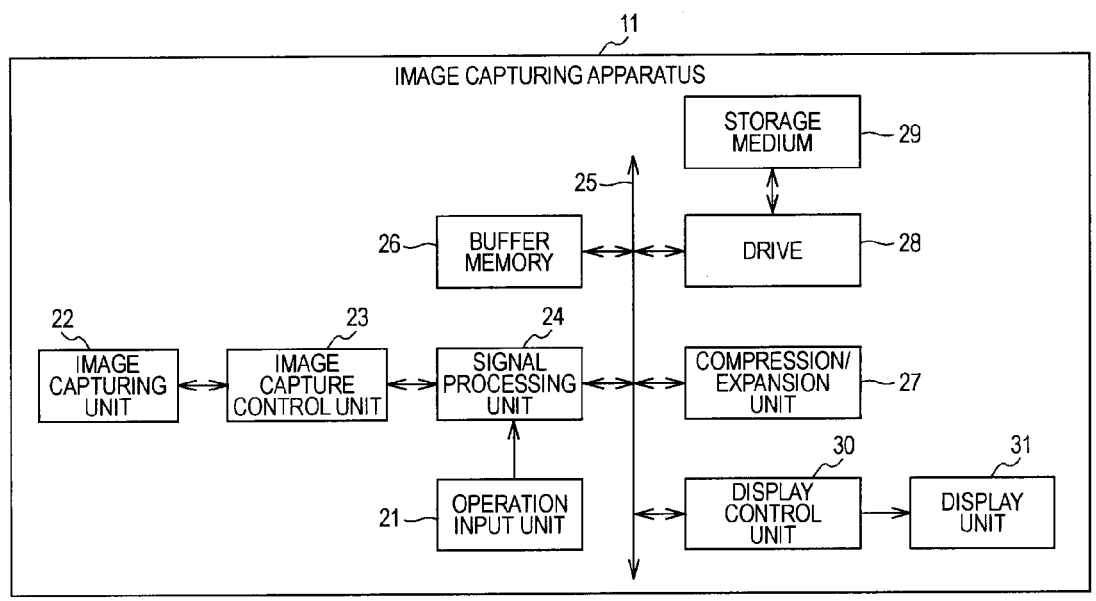
FIG. 3 is a diagram illustrating an exemplary configuration of an image capturing apparatus according to an embodiment of the invention.

FIG. 3 is a diagram illustrating an exemplary configuration of the image capturing apparatus 11 according to the embodiment of the invention.

The image capturing apparatus 11 includes an operation input unit 21, an image capturing unit 22, an image capture control unit 23, a signal processing unit 24, a bus 25, a buffer memory 26, a compression/expansion unit 27, a drive 28, a storage medium 29, a display control section 30, and a display section 31.

The operation input unit 21 is formed as a button or the like, and is operated by a user so as to supply the processing unit 24 with a signal according to the operation. The image capturing unit 22 is formed as an optical lens or an imaging element, and captures images by performing photoelectric conversion of the light from the subject, and supplies the captured images to the image capture control unit 23. The image capture control unit 23 controls the image capturing performed by the image capturing unit 22, and supplies the captured images obtained from the image capturing unit 22 to the signal processing unit 24.

The signal processing unit 24 is connected to the buffer memory 26, to the drive 28, and the display control section 30 through the bus 25, and thus controls the entirety of the image capturing apparatus 11 in response to the signal transmitted from the operation input unit 21.

For example, the signal processing unit 24 supplies the captured images, which are transmitted from the image capture control unit 23, to the buffer memory 26 through the bus 25, or generates the panoramic motion image from the captured images obtained from the buffer memory 26. Further, the signal processing unit 24 generates the partial panoramic motion image, pan motion image, subject-tracking motion image, and the like from the captured images which are obtained from the buffer memory 26.

The buffer memory 26 is formed as an SDRAM (Synchronous Dynamic Random Access Memory) or the like, and temporarily stores data such as the captured images supplied through the bus 25. The compression/expansion unit 27 encodes or decodes the images supplied through the bus 25 in a predetermined format.

The drive 28 stores the panoramic motion image, which is supplied from the bus 25, in the storage medium 29, or reads out the panoramic motion image stored in the storage medium 29 and outputs the image to the bus 25. The storage medium 29 is formed as a non-volatile memory removable from the image capturing apparatus 11, and stores the panoramic motion image in accordance with the control of the drive 28.

The display control section 30 supplies the panoramic motion image and the like, which are transmitted through the bus 25, to the display section 31, and displays those. The display section 31 is formed as, for example, an LCD (Liquid Crystal Display) or the like, and displays various images such as the panoramic motion image in accordance with the control of the display control section 30.

Configuration of Signal Processing Section

Figure 4:
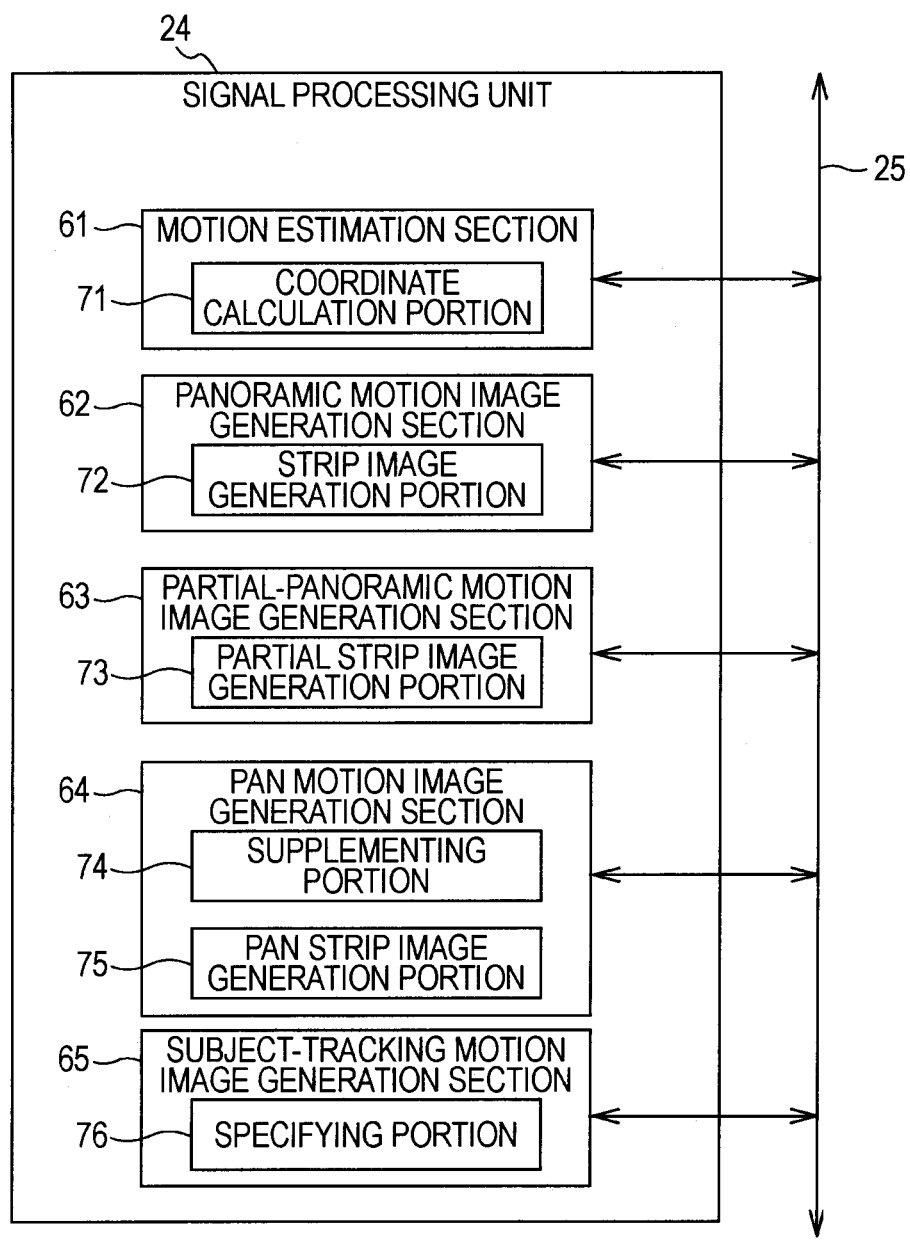
FIG. 4 is a diagram illustrating an exemplary configuration of a signal processing section.

Further, the signal processing unit 24 of FIG. 3 is configured, more specifically, as shown in FIG. 4.

That is, the signal processing unit 24 includes a motion estimation section 61, a panoramic motion image generation section 62, partial-panoramic motion image generation section 63, pan motion image generation section 64, and subject-tracking motion image generation section 65.

The motion estimation section 61 performs motion estimation by using the two captured images which are supplied through the bus 25 and of which the image capture times are different. The motion estimation section 61 has a coordinate calculation portion 71.

The coordinate calculation portion 71 generates, on the basis of the result of the motion estimation, information which represents a relative positional relationship of the captured images when the captured images are aligned on a predetermined plane so as to overlap the same subjects on the two captured images with each other. Specifically, the coordinates (hereinafter, referred to as center coordinates) of the center positions of the captured images in a 2-dimensional xy coordinate system on the predetermined plane are calculated as the information representing the relative positional relationship of the captured images.

The panoramic motion image generation section 62 generates the panoramic motion image by using the captured images, which are supplied through the bus 25, and the center coordinates. The panoramic motion image generation section 62 has a strip image generation portion 72. The strip image generation portion 72 generates strip images by cutting out predetermined areas on the captured images on the basis of the captured images and the center coordinates. The panoramic motion image generation section 62 generates a plurality of panoramic images by stitching the generated strip images, and generates the panoramic motion image as a panoramic image group.

Here, a panoramic motion image corresponding to one frame, that is, one panoramic image is an image in which the entire range (the entire area) on the image capturing space as the image capturing target is displayed as a subject at the time of the image capturing for obtaining the captured images.

The partial-panoramic motion image generation section 63 generates a partial panoramic motion image by using the captured images, which are supplied through the bus 25, and the center coordinates. The partial panoramic motion image is an image on which only a predetermined area on the panoramic motion image is displayed, and is formed of a plurality of partial panoramic images.

Further, the partial-panoramic motion image generation section 63 has a partial-strip image generation portion 73. The partial-strip image generation portion 73 generates partial strip images by cutting out predetermined areas on the captured images on the basis of the captured images and the center coordinates. The partial-panoramic motion image generation section 63 generates a plurality of partial panoramic images by stitching the generated partial strip images, and generates a partial panoramic motion image as a partial panoramic image group.

The pan motion image generation section 64 generates a pan motion image by using the captured images, which are supplied through the bus 25, and the center coordinates. The pan motion image is an image on which a partial area on the image capturing space as the image capturing target is displayed as a subject at the time of the image capturing for obtaining the captured images, and is formed of a plurality of pan images. Each pan image includes mutually different areas on the image capturing space as subjects.

Further, the pan motion image generation section 64 has a supplementing portion 74 and a pan-strip image generation portion 75. The supplementing portion 74 supplements new captured images between the successively captured images. The pan-strip image generation portion 75 generates pan strip images by cutting out predetermined areas on the supplemented captured images. The pan motion image generation section 64 generates a plurality of pan strip images by stitching the generated pan strip images, and generates a pan motion image as a pan image group.

The subject-tracking motion image generation section 65 generates a subject-tracking motion image by using the captured images, which are supplied through the bus 25, and the center coordinates. The subject-tracking motion image generation section 65 has a specifying portion 76. The specifying portion 76 specifies that the designated moving subject on the panoramic motion image is included in the plurality of the captured images. The subject-tracking motion image generation section 65 generates the subject-tracking motion image by cutting out the moving subject from the captured image specified by the specifying portion 76.

Description of Process of Reproducing Motion Image

Next, with reference to the flowchart of FIG. 5, a process of reproducing the motion image will be described which generates various kinds of motion image such as the panoramic motion image by allowing the image capturing apparatus 11 to capture images and to reproduce the motion images. The process of reproducing the motion images starts when a user operates the operation input unit 21 and thereby issues an instruction to generate the panoramic motion image.

In step S11, the image capturing unit 22 captures an image of a subject in a state where the image capturing apparatus 11 is moving as shown in FIG. 1. In such a manner, it is possible to obtain one captured image (hereinafter, referred to as one frame). The captured image obtained by the image capturing unit 22 is supplied from the image capturing unit 22 to the signal processing unit 24 through the image capture control unit 23.

In step S12, the signal processing unit 24 supplies and temporarily stores the captured image, which is supplied from the image capturing unit 22, to and in the buffer memory 26 through the bus 25. At this time, the signal processing unit 24 assigns frame numbers to the captured images so as to be able to specify what number the captured image is which is stored. In addition, hereinafter, the n-th captured image P(n) is referred to as a captured image P(n) of a frame n.

In step S13, the motion estimation section 61 acquires the captured images of the current frame n and the immediately previous frame (n−1) thereto from the buffer memory 26 through the bus 25, and aligns the captured images by the motion estimation.

For example, in the immediately preceding step S12, if the captured image stored in the buffer memory 26 is the n-th captured image P(n), the motion estimation section 61 acquires the captured image P(n) of the current frame n and the captured image P(n−1) of the immediately previous frame (n−1).

Figure 6:
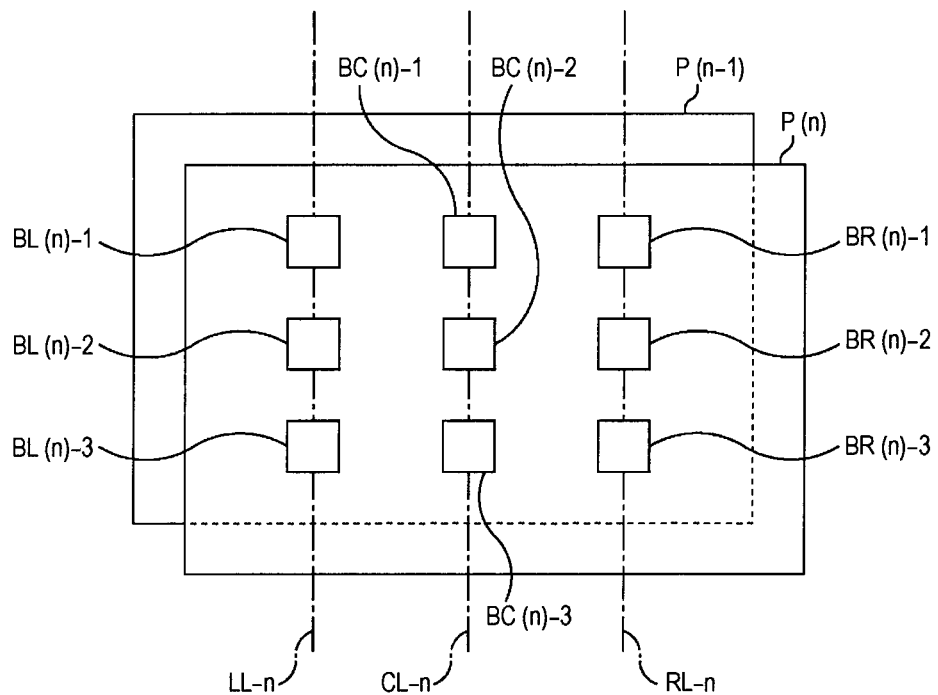
FIG. 6 is a diagram illustrating alignment of captured images.

Then, the motion estimation section 61 searches, as shown in FIG. 6, positions at which the same images as nine blocks BL(n)-1 to BR(n)-3 on the captured image P(n) are located, on the captured image P(n−1) of the immediately previous frame, thereby performing the alignment.

Here, the blocks BC(n)-1 to BC(n)-3 are rectangular areas aligned in a vertical direction of the drawing on a boundary CL-n which is an imaginary straight line in the vertical direction of the drawing and located at substantially the center of the captured image P(n).

Further, the blocks BL(n)-1 to BL(n)-3 are rectangular areas aligned in the vertical direction of the drawing on a boundary LL-n which is an imaginary straight line in the vertical direction and located on the left side of the boundary CL-n of the captured image P(n) in the drawing. Likewise, the blocks BR(n)-1 to BR(n)-3 are rectangular areas aligned in the vertical direction of the drawing on a boundary RL-n which is an imaginary straight line in the vertical direction and located on the right side of the boundary CL-n of the captured image P(n) in the drawing. The positions of the nine blocks BL(n)-1 to BR(n)-3 are set in advance.

The motion estimation section 61 searches, relative to the nine blocks on the captured image P(n), areas (hereinafter, referred to as block correspondence areas), in which the differences from the blocks are smallest in area, which have the same shapes and sizes as the blocks, on the captured image P(n−1). Here, the difference from each block is defined as the sum of the absolute differences of pixel values of the pixels at the same position between the block, such as the block BL(n)-1, as a processing target and the area as a candidate of the block correspondence area.

When the motion estimation is performed, ideally for each of the blocks BL(n)-1 to BR(n)-3 on the captured image P(n), it is possible to obtain the block correspondence area located on the captured image P(n−1) on the basis of a positional relationship similar to the relative positional relationship of the block.

Each block correspondence area of the captured image P(n−1) corresponding to each block of the processing target on the captured image P(n) is an area in which the difference from the block of the processing target is smallest, on the captured image P(n−1). Hence, in the block correspondence area, it can be assumed that the same image as the block of the processing target is displayed.

Consequently, the captured image P(n) and the captured image P(n−1) are aligned on a predetermined plane in a superimposed manner so as to overlap the block correspondence areas corresponding to the blocks BL(n)-1 to BR(n)-3 with each other, and then the same subjects on the captured images overlap each other.

As it is, sometimes the relationship of the same positions may be not established between the blocks and the block correspondence areas. Hence, more specifically, the motion estimation section 61 aligns the captured image P(n) and the captured image P(n−1) on the plane so as to substantially overlap all the blocks and the block correspondence areas with each other, and sets the result as a result of the alignment of the captured images.

In addition, when a moving subject exists on the captured images and the subject is included in the blocks on the captured image P(n), the relationship of the same positions is not established between the obtained nine block correspondence areas and the blocks BL(n)-1 to BR(n)-3.

When the relative positional relationship of the obtained block correspondence areas is different from the relative positional relationship of the blocks on the captured image P(n), the motion estimation section 61 removes the blocks which are estimated to include the moving subject, and performs alignment again on the basis of the motion estimation. In other words, the block correspondence areas different in relative positional relationship from other block correspondence areas are detected, and then the blocks on the captured image P(n) corresponding to the detected block correspondence areas are removed from the processing target, thereby performing the motion estimation again on the basis of only the remaining blocks.

Specifically, the blocks BL(n)-1 to BR(n)-3 are aligned equidistantly at an equal distance QL in vertical and horizontal directions in FIG. 6. For example, the distance between the block BL(n)-1 and the block BL(n)-2 adjacent to each other and the distance between the block BL(n)-1 and the block BC(n)-1 adjacent to each other are equal to the distance QL. In this case, the motion estimation section 61 detects the blocks in which a motion exists on the captured image P(n) on the basis of the relative positional relationship of the block correspondence areas corresponding to the blocks.

That is, the motion estimation section 61 calculates a distance QM between the block correspondence areas, which are adjacent to each other, such as between the block correspondence area corresponding to the block BR(n)-3 and the block correspondence area corresponding to the block BC(n)-3.

As a result, assuming that the distance QM is a distance between the block correspondence area corresponding to the block BR(n)-2 or the block BC(n)-3 and the block correspondence area corresponding to the block BR(n)-3, the absolute difference between the distance QL and the distance QM is equal to or more than a threshold value which is determined in advance.

Further, assuming that the distance QM is a distance between the block correspondence area corresponding to the block BR(n)-2 or the block BC(n)-3 and the other adjacent block correspondence area (except the block correspondence area corresponding to the block BR(n)-3), the absolute difference between the distance QL and the distance QM is less than the threshold value which is determined in advance.

In this case, the block correspondence areas of other blocks different from the block BR(n)-3 are aligned side by side in a position relationship the same as the relative positional relationship of blocks. However, only the block correspondence area of the block BR(n)-3 satisfies, relative to other block correspondence areas, a positional relationship different from the positional relationship of the blocks. When such a detection result is obtained, the motion estimation section 61 estimates that the block BR(n)-3 includes the moving subject.

In addition, in detection of the block in which a motion exists, not only the distances between the block correspondence areas adjacent to each other but also the rotation angles of the focused block correspondence area relative to other adjacent block correspondence areas and the like may be used. That is, for example, there may be a block correspondence area which is tilted towards another block correspondence area by a predetermined angle or more. In this case, it can be inferred that the block corresponding to the block correspondence area includes a moving subject.

As described above, when the block in which a motion exists is detected, the motion estimation section 61 performs the alignment between the captured image P(n) and the captured image P(n−1) by the motion estimation using the remaining blocks except the block in which the motion exists.

As described above, the alignment is performed on the basis of only the blocks including the non-moving subjects except the blocks including the moving subjects, that is, only so-called background, and thus it is possible to more accurately perform the alignment. When the captured image P(n) and the captured image P(n−1) are aligned in accordance with the result of the alignment, the captured images are aligned in a superimposed manner so as to overlap the non-moving subjects with each other.

When the alignment is performed, then the coordinate calculation portion 71 calculates the center coordinates of the captured image P(n) obtained when aligning the captured images P(1) to P(n) obtained so far on the predetermined plane, that is, on the xy coordinate system in accordance with the result of the alignment of the frames.

Figure 7:
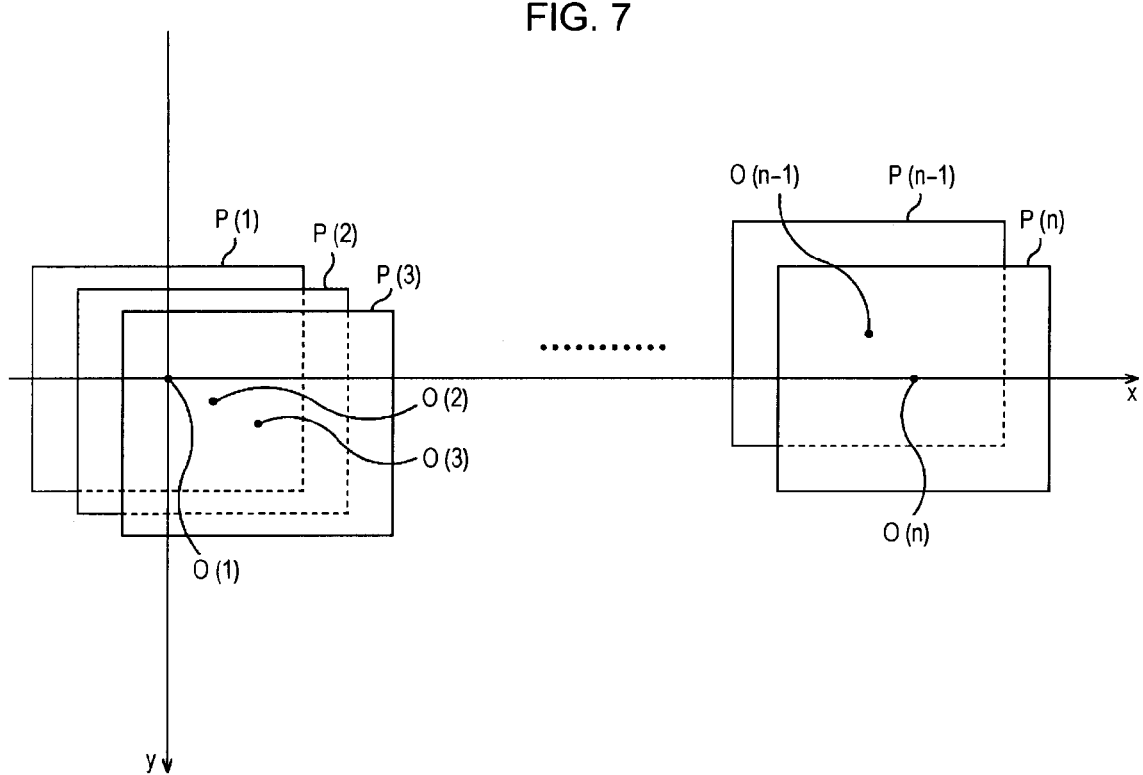
FIG. 7 is a diagram illustrating calculation of center coordinates.

For example, as shown in FIG. 7, the center of the captured image P(1) is set to the position of the origin of the xy coordinate system. Then, the captured images can be aligned so as to overlap the same subjects included in the captured images with each other. In addition, in the drawing, the horizontal direction represents the x direction, and the vertical direction represents the y direction. Further, the points O(1) to O(n) on the captured images P(1) to P(n) represent the positions of the centers of the captured images.

For example, if the captured image of the current frame of the processing target is the captured image P(n), the center coordinates of the respective center points O(1) to O(n−1) of the captured images P(1) to P(n−1) are calculated in advance, and are stored in the buffer memory 26.

The coordinate calculation portion 71 reads out the center coordinates of the captured image P(n−1) from the buffer memory 26, and calculates the center coordinates of the captured image P(n) from the readout center coordinates and the result of the alignment of the captured images P(n) and P(n−1). Consequently, the x coordinate and the y coordinate of the point O(n) are calculated as the center coordinates.

Figure 5:
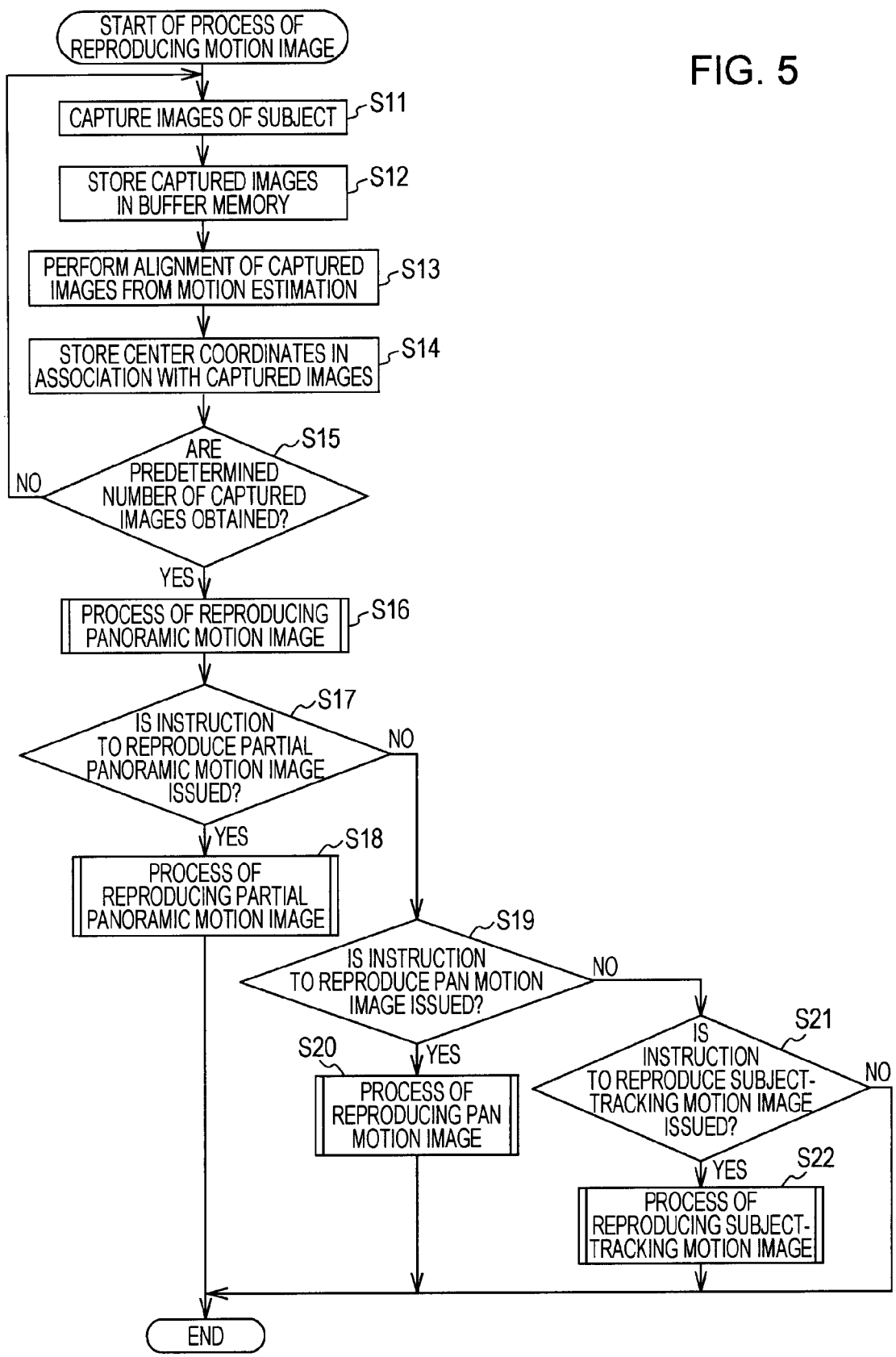
FIG. 5 is a flowchart illustrating a process of reproducing a motion image.

Returning to the description of the flowchart of FIG. 5, when the alignment is performed and the center coordinates of the captured image P(n) are calculated in step S13, and the process advances to step S14.

In step S14, the motion estimation section 61 supplies the obtained center coordinates of the captured image P(n) to the buffer memory 26, and stores the coordinates in association with the captured image P(n).

In step S15, the signal processing unit 24 determines whether or not a predetermined number of the captured images are obtained. For example, as shown in FIG. 1, an image of an area on the predetermined space may be captured in N parts. In this case, when the N captured images are obtained, it is determined that the predetermined number of the captured images is obtained.

In addition, the image capturing apparatus 11 may be provided with an instrument, such as a gyro sensor, capable of detecting the rotation angle of the image capturing apparatus 11. In this case, it may be determined not whether the predetermined number of the captured images is obtained but whether the image capturing apparatus 11 is rotated by a predetermined angle after the start of the image capturing for obtaining the captured images. Even in this case, the entirety of the specific area on the predetermined space is set as a subject, and thus it is possible to specify whether or not the image capturing for obtaining the captured images is performed.

In step S15, if it is determined that the predetermined number of the captured images is not yet obtained, the process returns to step S11, and then the captured image of the next frame is obtained.

In contrast, in step S15, if it is determined that the predetermined number of the captured images are obtained, the process advance to step S16.

In step S16, the image capturing apparatus 11 performs a process of reproducing a panoramic motion image. That is, the signal processing unit 24 acquires the captured images and the center coordinates from the buffer memory 26, and generates the panoramic motion image on the basis of the captured images and the center coordinates. Further, the display control section 30 reproduces the generated panoramic motion image, and allows the display section 31 to display the panoramic motion image. In addition, the process of reproducing the panoramic motion image will be described later in detail.

When the process of reproducing the panoramic motion image is performed, the display section 31 displays the panoramic motion image. Then, a user operates the operation input unit 21 if necessary, and designates a desired position on the displayed panoramic motion image, thereby issuing an instruction to reproduce various kinds of the motion image. When the operation is performed by the user, a signal according to the operation is supplied from the operation input unit 21 to the signal processing unit 24.

In step S17, the signal processing unit 24 determines, on the basis of the signal from the operation input unit 21, whether or not the instruction to reproduce the partial panoramic motion image has been issued.

If it is determined that the instruction to reproduce the partial panoramic motion image has been issued in step S17, the image capturing apparatus 11 performs the process of reproducing the partial panoramic motion image in step S18, and then the process of reproducing the motion image ends.

Specifically, on the basis of the captured images and the center coordinates stored in the buffer memory 26, the partial panoramic motion image is generated, thereby reproducing the generated partial panoramic motion image. In addition, the process of reproducing the partial panoramic motion image will be described later in detail.

In contrast, in step S17, if it is determined that the instruction to reproduce the partial panoramic motion image is not issued, the process advances to step S19.

In step S19, the signal processing unit 24 determines, on the basis of the signal from the operation input unit 21, whether or not the instruction to reproduce the pan motion image is issued.

If it is determined that the instruction to reproduce the pan motion image is issued in step S19, the image capturing apparatus 11 performs the process of reproducing the pan motion image in step S20, and then the process of reproducing the motion image ends. That is, on the basis of the captured images and the center coordinates stored in the buffer memory 26, the pan motion image is generated, thereby reproducing the generated pan motion image. In addition, the process of reproducing the pan motion image will be described later in detail.

In contrast, if it is determined that the instruction to reproduce the pan motion image is not issued in step S19, the signal processing unit 24 determines, on the basis of the signal from the operation input unit 21, whether or not the instruction to reproduce the subject-tracking motion image is issued in step S21.

If it is determined that the instruction to reproduce the subject-tracking motion image is issued in step S21, the image capturing apparatus 11 performs the process of reproducing the subject-tracking motion image in step S22, and then the process of reproducing the motion image ends. Specifically, on the basis of the captured images and the center coordinates stored in the buffer memory 26, the subject-tracking motion image is generated, thereby reproducing the generated subject-tracking motion image. In addition, the process of reproducing the subject-tracking motion image will be described later in detail.

Further, in step S21, if it is determined that the instruction to reproduce the subject-tracking motion image is not issued, the reproducing of the displayed panoramic motion image is terminated. Then, the process of reproducing the motion image ends.

In such a manner, the image capturing apparatus 11 generates and reproduces the panoramic motion image by using the plurality of captured images obtained at different times. Further, in the process of reproducing the panoramic motion image, when the user issues the instruction to reproduce the partial panoramic motion image, the pan motion image, or the subject-tracking motion image, the image capturing apparatus 11 generates and reproduces the motion image subjected to the instruction.

Description of Process of Reproducing Panoramic Motion Image

Next, a process of reproducing the panoramic motion image corresponding to the process of step S16 in FIG. 5 is described with reference to the flowchart of FIG. 8.

In step S51, the strip image generation portion 72 acquires the N captured images and the center coordinates of those from the buffer memory 26, and generates the strip images by cutting out predetermined areas of the captured images on the basis of the acquired captured images and center coordinates.

Figure 9:
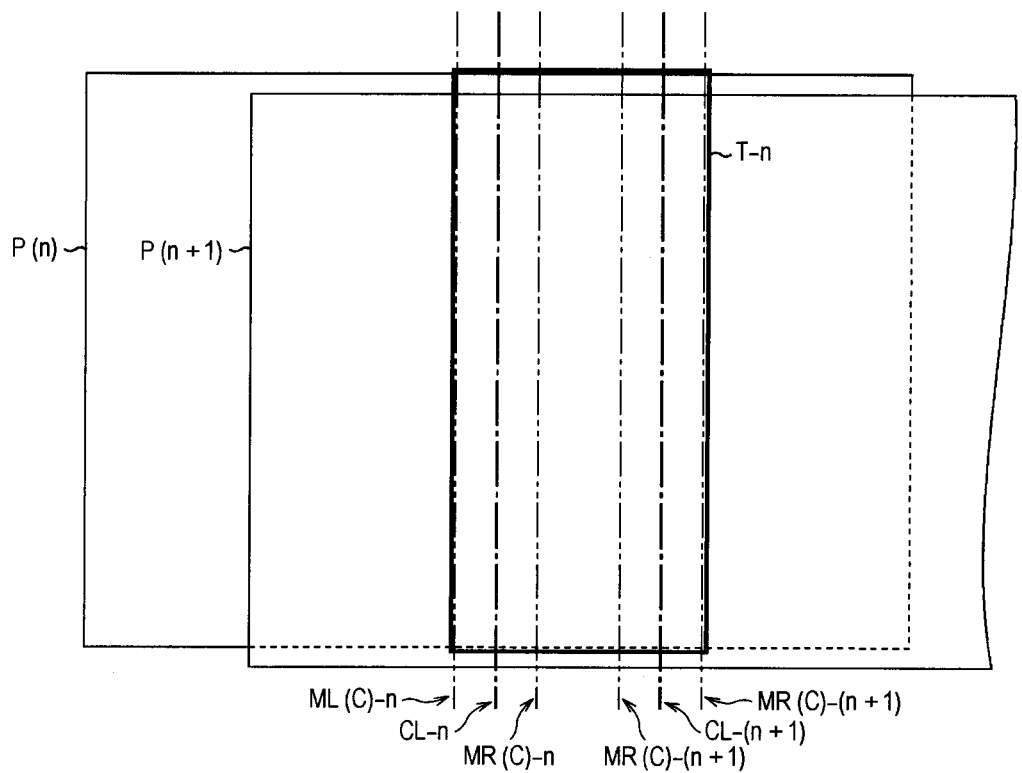
FIG. 9 is a diagram illustrating cutout of strip images.

For example, the strip image generation portion 72 cuts out, as shown in FIG. 9, an area which is set on the basis of the boundary CL-n on the captured image P(n) as a strip image T-n. In addition, in FIG. 9, the elements corresponding to the case in FIG. 6 will be represented by the same reference numerals and signs, and description thereof will be omitted.

In FIG. 9, the successively captured images P(n) and P(n+1) are aligned so that the same subjects overlap with each other on the basis of the center coordinates. The boundary CL-(n+1) on the captured image P(n+1) is a boundary corresponding to the boundary CL-n on the captured image P(n). That is, the boundaries CL-n and CL-(n+1) are imaginary straight lines in the vertical direction of the drawing and are located at the same positions on the captured images P(n) and P(n+1).

Further, in the drawing, the boundaries ML(C)-n and MR(C)-n as vertically straight lines are straight lines near the boundary CL-n on the captured image P(n), and are located at a predetermined distance away from the boundary CL-n toward the left side and the light side of the boundary CL-n, respectively.

Likewise, in the drawing, the boundaries ML(C)-(n+1) and MR(C)-(n+1) as vertically straight lines are straight lines near the boundary CL-(n+1) on the captured image P(n+1), and are located at a predetermined distance away from the boundary CL-(n+1) toward the left side and the light side of the boundary CL-(n+1), respectively.

For example, when cutting the strip image T-n from the captured image P(n), the strip image generation portion 72 cuts out an area from the boundary ML(C)-n to the boundary MR(C)-(n+1) on the captured image P(n) as the strip image T-n. Here, the position of the boundary MR(C)-(n+1) on the captured image P(n) is a position on the captured image P(n) overlapping with the boundary MR(C)-(n+1) when the captured images P(n) and P(n+1) are aligned.

Likewise, when the strip image T-(n−1) is cut out from the captured image P(n−1), the area from the boundary ML(C)-(n−1) to the boundary MR(C)-n on the captured image P(n−1) is cut out as the strip image T-(n−1).

Accordingly, the subject of the area from the boundary ML(C)-n to the boundary MR(C)-n in the strip image T-n is basically identical to the subject of the area from the boundary ML(C)-n to the boundary MR(C)-n in the strip image T-(n−1). However, the strip images T-n and T-(n−1) are images cut out from the captured images P(n) and P(n−1) respectively. Thus, even if the subjects are identical, the image capture times thereof are different.

Likewise, the subject of the area from the boundary ML(C)-(n+1) to the boundary MR(C)-(n+1) in the strip image T-n is basically identical to the subject of the area from the boundary ML(C)-(n+1) to the boundary MR(C)-(n+1) in the strip image T-(n+1).

As described above, each strip image is made by cutting the area which is set on the basis of the boundary at substantially the center of the captured image. Then, when the strip images cut out from the captured images are aligned, the entire area on the image capturing space as the image capturing target (area) at the time of the image capturing for obtaining the N captured images is displayed. Accordingly, one image, which is obtained by aligning and stitching the strip images obtained from the captured images, is treated as a panoramic image corresponding to one frame constituting the panoramic motion image.

In step S52, the panoramic motion image generation section 62 aligns and stitches the strip images of the frames on the basis of the center coordinates of the strip images and captured images, thereby generating image data corresponding to one frame of the panoramic motion image, that is, generating one panoramic image.

For example, as the strip images T-n and T-(n−1) are stitched, as to the area from the boundary ML(C)-n to the boundary MR(C)-n in the strip images, the panoramic motion image generation section 62 calculates pixel values of the pixels of the panoramic image by means of weighted addition.

That is, when the strip images T-n and T-(n−1) are aligned on the basis of the center coordinates, the areas from the boundary ML(C)-n to the boundary MR(C)-n in the strip images overlap with each other. The panoramic motion image generation section 62 performs the weighted addition of the pixel values of the pixels overlapping with each other in the strip images T-n and T-(n−1), and sets values, which are obtained from the result of weighted addition, as the pixel values of the pixels of the panoramic image at the pixel correspondence positions.

In addition, in the strip images T-n and T-(n−1), the weight at the time of the weighted addition of the pixels of the area from the boundary ML(C)-n to the boundary MR(C)-n is set as follows.

Specifically, in the case of the pixels located in the range from the boundary CL-n to the boundary MR(C)-n, as the position of the pixel gets closer to the position of the boundary MR(C)-n from the position of the boundary CL-n, the pixel of the strip image T-n contributes more to the generation of the panoramic image. Conversely, in the case of the pixels located in the range from the boundary CL-n to the boundary ML(C)-n, as the position of the pixel gets closer to the position of the boundary ML(C)-n from the position of the boundary CL-n, the pixel of the strip image T-(n−1) contributes more to the generation of the panoramic image.

Further, at the time of generating the panoramic image, the area from the boundary MR(C)-n to the boundary ML(C)-(n+1) of the strip image T-n is directly set as a panoramic image.

Moreover, at the time of stitching the strip images T-n and T-(n+1), as for the areas from the boundary ML(C)-(n+1) to the boundary MR(C)-(n+1) in the strip images, the pixel values of the pixels of the panoramic image are obtained by the weighted addition.

That is to say, in the case of the pixels located in the range from the boundary CL-(n+1) to the boundary MR(C)-(n+1), as the position of the pixel gets closer to the position of the boundary MR(C)-(n+1) from the position of the boundary CL-(n+1), the pixel of the strip image T-(n+1) contributes more to the generation of the panoramic image. Conversely, in the case of the pixels located in the range from the boundary CL-(n+1) to the boundary ML(C)-(n+1), as the position of the pixel gets closer to the position of the boundary ML(C)-(n+1) from the position of the boundary CL-(n+1), the pixel of the strip image T-n contributes more to the generation of the panoramic image.

As described above, as the strip images are stitched, the pixel values of the pixels of the panoramic image are set by performing the weighted addition on the areas in the vicinity of the edges of the strip images of the successive frames. Thereby, it is possible to obtain a more natural image as compared with the case where one image is generated by simply aligning the strip images.

For example, when a panoramic image is formed by simply aligning the strip images, there are the following concerns: the outlines of the subjects near the edges of the strip images are distorted; the strip images of the successive frames are different in brightness; and unevenness in brightness occurs for each area of the panoramic image.

Consequently, in the panoramic motion image generation section 62, the areas near the edges of the strip images are stitched in terms of weighted addition, thereby preventing the outlines of the subjects from being distorted and unevenness in brightness from occurring. As a result, it is possible to obtain more natural panoramic images.

Further, at the time of aligning the captured images, the motion estimation section 61 detects lens distortion of optical lenses constituting the image capturing unit 22 on the basis of the captured images. Then, at the time of stitching the strip images, the strip image generation portion 72 may correct strip images on the basis of the detection result of the lens distortion. That is, on the basis of the detection result of the lens distortion, the distortion occurring in the strip images is corrected by image processing.

The panoramic motion image corresponding to one frame obtained in such a manner is an image in which the entire area of the image capturing area on the image capturing space as the image capturing target is displayed as a subject at the time of the image capturing for obtaining the N captured images. The panoramic motion image generation section 62 generates the panoramic motion image corresponding to one frame, and then supplies the image data of the generated panoramic motion image to the compression/expansion unit 27 through the bus 25.

In step S53, the compression/expansion unit 27 encodes the image data of the panoramic motion image supplied from the panoramic motion image generation section 62 in for example the JPEG (Joint Photographic Experts Group) format, and supplies the encoded image data to the drive 28 through the bus 25.

The drive 28 supplies and stores the image data of the panoramic motion image, which is transmitted from the compression/expansion unit 27, to and in the storage medium 29. At the time of storing the image data, the frame numbers are assigned to the image data by the panoramic motion image generation section 62.

In step S54, the signal processing unit 24 determines whether or not the image data of the panoramic motion image corresponding to a predetermined number of the frames is generated. For example, it may be assumed that the panoramic motion image is generated from the image data of M frames. In this case, when the image data corresponding to M frames is obtained, it is determined that the panoramic motion image corresponding to the predetermined number of the frames is generated.

In step S54, if it is determined that the panoramic motion image corresponding to the predetermined number of the frames is not yet generated, the process returns to step S51, and the image data of the next frame of the panoramic motion image is generated.

For example, when the image data of the first frame of the panoramic motion image is generated, as described with reference to FIG. 9, the area from the boundary ML(C)-n to the boundary MR(C)-(n+1) of the captured image is cut out, and is set as the strip image T-n of the captured image P(n).

Then, when the image data subsequent to the second frame of the panoramic motion image is generated, the cut-out position of the strip image T-n, which is cut out from the captured image P(n), is shifted in the left direction of FIG. 9 a width CW at a time from the boundary CL-n to the boundary CL-(n+1).

That is, the strip image T-n of the m-th frame of the panoramic motion image is represented by a strip image T(m)-n (where 1≤m≤M). In this case, the cut-out position of the strip image T(m)-n of the m-th frame is set as a position which is shifted leftward in FIG. 9 from the cut-out position of the strip image T(1)-n by a distance (m−1) times the width CW.

Accordingly, for example, the area, from which the strip image T(2)-n of the second frame is cut out, is set as an area, of which the right edge is located at the boundary MR(C)-n, in areas which have the same shapes and sizes as the strip image T-n in FIG. 9 on the captured image P(n).

Here, the direction of shifting the cut-out area of the strip image is determined in advance in accordance with the direction of rotating the image capturing apparatus 11 at the time of the image capturing for obtaining the captured images. For example, in the example of FIG. 9, it is the premise that the image capturing apparatus 11 is rotated so that, relative to the center position of the captured image of the predetermined frame, the center position of the captured image of the next frame is located on the right side of the drawing. Consequently, in the example of FIG. 9, it is the premise that the direction of moving the image capturing apparatus 11 at the time of the image capturing is the right direction (the x direction) of the drawing.

The reason is that, when the cut-out position of the strip image is shifted for each frame in the direction opposite to the direction of moving the center position of the captured image according to the movement of the image capturing apparatus 11, the same non-moving subject is displayed at the same position on the panoramic images constituting the panoramic motion image.

Figure 10:
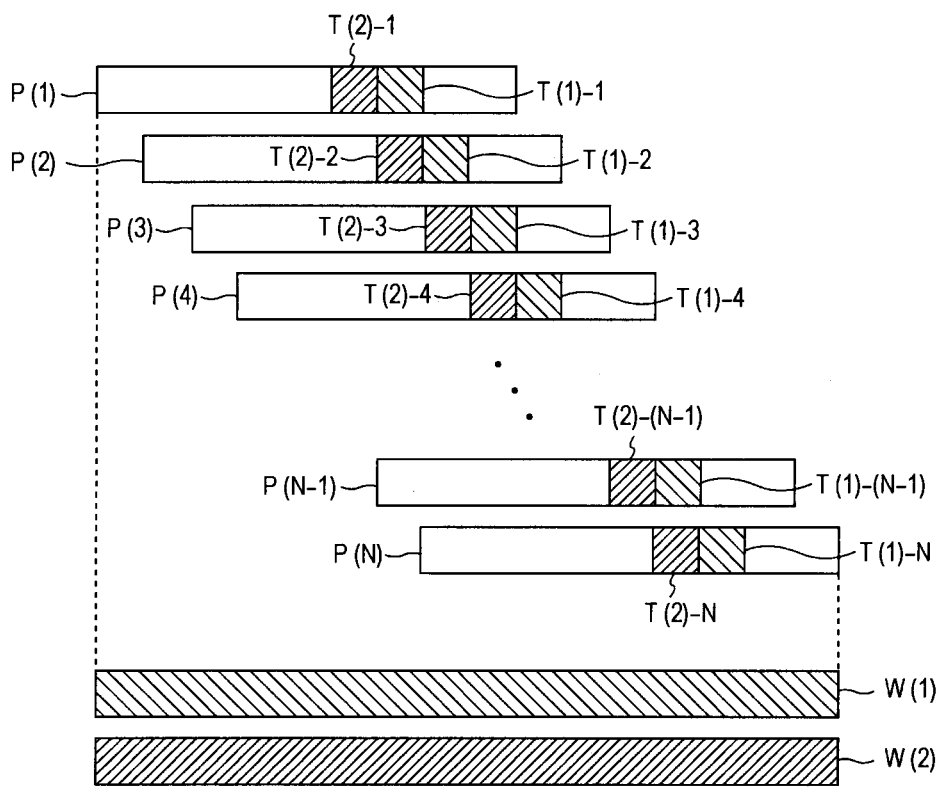
FIG. 10 is a diagram illustrating generation of the panoramic motion image.

As described above, while the cut-out position of the strip image is shifted for each frame, the image data of the frames of the panoramic motion image is generated, and thereby it is possible to obtain the panoramic motion image, for example, as shown in FIG. 10. In addition, in FIG. 10, the horizontal direction of the drawing corresponds to the horizontal direction of FIG. 9. For example, the horizontal direction of FIG. 10 corresponds to the x direction on the xy coordinate system.

In the example of FIG. 10, the respective strip images T(1)-1 to T(1)-N are generated from the respective N captured images P(1) to P(N), and then the strip images are stitched. Thereby, it is possible to obtain a panoramic image W(1).

Likewise, the respective strip images T(2)-1 to T(2)-N are generated from the respective N captured images P(1) to P(N), and then the strip images are stitched. Thereby, it is possible to obtain a panoramic image W(2).

Here, the panoramic images W(1) and W(2) are images constituting the first and second frames of the panoramic motion image, respectively. Further, for example, the cut-out area of the strip image T(2)-2 on the captured image P(2) is set as an area corresponding to the position of the cut-out area of the strip image T(1)-2 shifted by the width CW in the left direction of the drawing. The size of the width CW changes for each frame of the captured image. Moreover, for example, the same subjects at different times are displayed on the strip images T(1)-1 and T(2)-2.

Accordingly, the same subjects at different times are the panoramic images W(1) and W(2). Further, the panoramic motion image corresponding to one frame is generated by stitching the strip images which are obtained from the captured images of the plurality of different frames. Hence, even in one panoramic image, the image capture times of the subjects displayed on the areas are different from each other.

In addition, more specifically, the edge portions of each panoramic image are generated by using the captured images P(1) and P(N). For example, the left edge portion of the panoramic image W(1) in the drawing is set as an image corresponding to a part in the range from the left edge of the captured image P(1) and to the right edge of the strip image T(1)-1.

Figure 8:
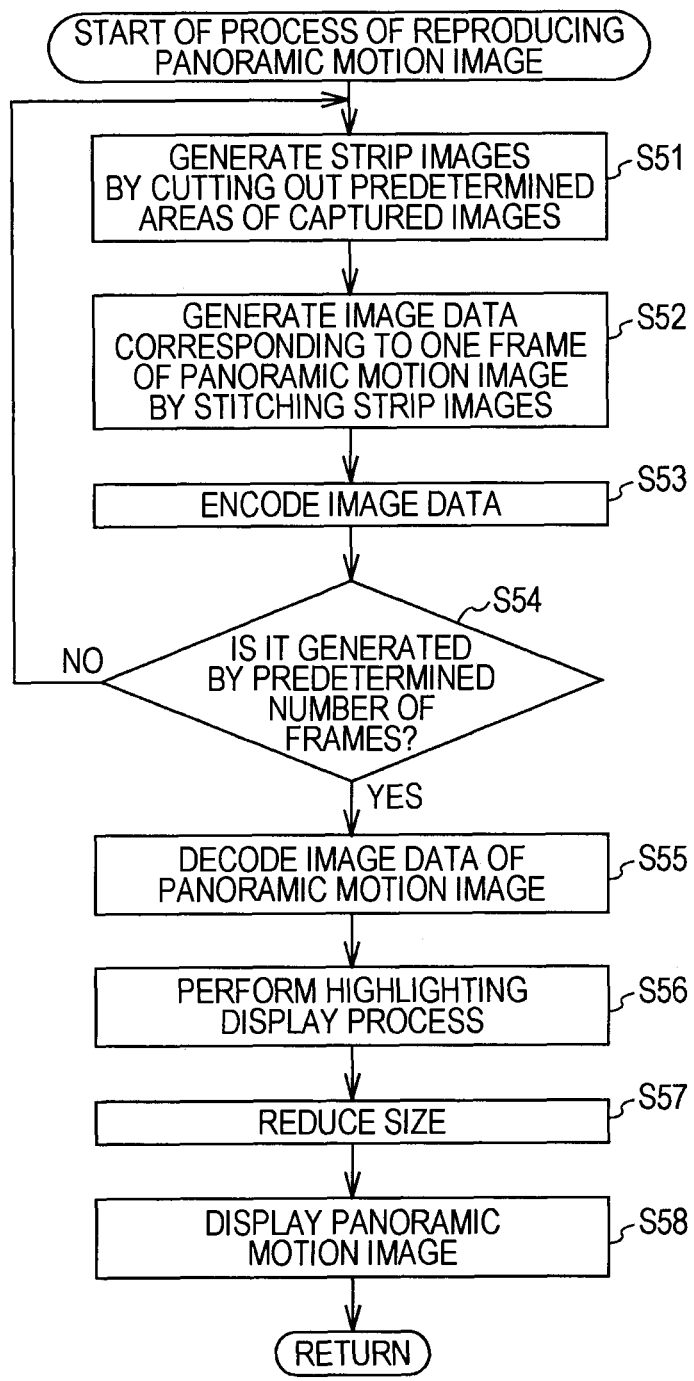
FIG. 8 is a flowchart illustrating a process of reproducing the panoramic motion image.

Returning to the description of the flowchart of FIG. 8, in step S54, if it is determined that the panoramic motion image corresponding to the predetermined number of the frames is generated, the signal processing unit 24 reads out the panoramic images of the frames constituting the panoramic motion image from the storage medium 29 through the drive 28. Then, the signal processing unit 24 supplies the readout panoramic image to the compression/expansion unit 27, and instructs the decoding thereof, and the process advances to step S55.

In step S55, the compression/expansion unit 27 decodes the image data of the panoramic motion image supplied from the signal processing unit 24, that is, the panoramic images in the JPEG format, and supplies the decoded image data to the signal processing unit 24.

In step S56, the signal processing unit 24 performs a highlighting display process on the panoramic motion image supplied from the compression/expansion unit 27.

That is, as for the panoramic images constituting the panoramic motion image, the signal processing unit 24 calculates the difference between the panoramic images of the successive frames, and detects the areas, in which the moving subjects are displayed, from the panoramic images. Here, the difference between the frames is obtained by calculating the differences between the pixel values of the pixels of the panoramic images for each area of the panoramic images.

Then, the signal processing unit 24 processes the panoramic image so that the area in which the moving subject is detected on the panoramic image is displayed and highlighted in a different display format from other areas. For example, the panoramic image is processed so that the part of the moving subject is displayed by a specific color such as red or is enclosed by a red frame at the time of reproducing the panoramic motion image.

As described above, by performing the highlighting display process on the panoramic motion image, a user is able to easily distinguish the moving part at the time of reproducing the panoramic motion image.

In step S57, the signal processing unit 24 reduces the size of each panoramic image of the frames, which constitute the panoramic motion image subjected to the highlighting display process, to a predetermined size. For example, a reducing process is performed so as to reach a size capable of displaying the entire panoramic image on the display screen of the display section 31.

When reducing the size of the panoramic motion image, the signal processing unit 24 supplies the reduced panoramic motion image to the display control section 30. In addition, the reduced panoramic motion image may be also supplied to and stored in storage medium 29.

In step S58, the display control section 30 supplies the panoramic motion image from the signal processing unit 24 to the display section 31, and displays the panoramic motion image. Consequently, the display control section 30 performs control to display the panoramic images constituting the panoramic motion image at a predetermined time interval in order of the frame numbers assigned to the panoramic images.

Thereby, the display section 31 sequentially displays the frames of the panoramic motion image at the predetermined time interval. That is, the motion image, in which the entirety of the area of the image capturing space as the image capturing target is set as a subject, is displayed at the time of the image capturing for obtaining the N captured images. Each panoramic image itself, which constitutes the frames of the panoramic motion image displayed in this manner, is a still image, but the areas on the same space are set as subjects, and thus each subject, which is displayed on each area of the panoramic motion image, has movement. When the panoramic motion image is displayed, the process of reproducing the panoramic motion image ends, and thereafter the process advances to step S17 of FIG. 5.

As described above, the image capturing apparatus 11 generates the plurality of strip images from the plurality of captured images, of which the image capture times are different, while shifting the cut-out area. Then, the image capturing apparatus 11 stitches the strip images for each cut-out position, thereby generating the panoramic images constituting the frames of the panoramic motion image.

By using the panoramic motion image which is generated in this manner, the subject, of which the image is captured, is made to have movement, and thereby the movement thereof can be displayed. Therefore, it is possible to more effectively display the captured image of the subject. Moreover, the subjects of the areas on one panoramic image respectively belong to different times, and thus it is possible to provide more interesting images. That is, it is possible to more effectively display the subject of which the image is captured.

In addition, in the above description, the N captured images are obtained, and once all the captured images are stored in the buffer memory 26, by using the captured images, the panoramic motion image is generated. However, while the image capturing for obtaining the captured images is performed, the panoramic motion image may be generated simultaneously.

Further, in the above description, once the panoramic motion image is generated, the panoramic motion image is reduced in size. However, the reduced panoramic motion image may be generated directly from the captured images. In this case, it is possible to further reduce the load of the processes performed until the panoramic motion image is reproduced, and thus it is possible to more promptly display the panoramic motion image. Besides, by providing a function to generate the panoramic motion image from the captured images in apparatuses such as a personal computer, the panoramic motion image may be generated from the captured images obtained by a camera.

Description of Process of Reproducing Partial Panoramic Motion Image

Next, with reference to the flowchart of FIG. 11, a process of reproducing a partial panoramic motion image corresponding to the process of step S18 of FIG. 5 will be described. The process of reproducing the partial panoramic motion image starts when a user designates a predetermined position on the panoramic motion image and issues an instruction to reproduce the partial panoramic motion image.

In step S81, the partial-panoramic motion image generation section 63 specifies a captured image as a processing target among the captured images stored in the buffer memory 26 on the basis of a signal transmitted from the operation input unit 21.

That is, the partial-panoramic motion image generation section 63 sets an area, which is centered on the position designated by the user and has a predetermined size, on the panoramic image. For example, the area BP of FIG. 2 is set. In addition, the size of the area BP may be set by a scale factor of the enlarged display designated by the user.

Then, the partial-panoramic motion image generation section 63 specifies the frame n in which the x coordinate of the boundary ML(C)-n of the captured image P(n) on the xy coordinate system is located at a position on the xy coordinate system corresponding to the position of the left edge of the set area BP in FIG. 2. Further, the partial-panoramic motion image generation section 63 specifies the frame n and the frame (n+α) in which the position and the x-direction length of the area BP are set.

Then, the partial-panoramic motion image generation section 63 sets the captured images from the frame n to the frame (n+α) as captured images which are the processing targets. The captured images are captured images necessary to generate a motion image on which the area BP on the panoramic image is displayed. In addition, by setting all the captured images, on which the subject within the area BP is displayed, as processing targets, the partial panoramic motion image is generated from the captured images of the processing targets.

In step S82, the partial-strip image generation portion 73 generates the partial strip images by cutting out predetermined areas of the captured images on the basis of the captured images, which are set as processing targets stored in the buffer memory 26, and the center coordinates of the capture images.

For example, a partial area of the strip image T-n of FIG. 9 is cut out from the captured image P(n) of the frame n as the partial strip image used in generation of the partial panoramic image of the first frame. Specifically, the width of the partial strip image in the horizontal direction of FIG. 9 is the same as that of the strip image T-n. In addition, the distance between the respective edges of the partial strip image in the vertical direction, that is, the distance between the upper and lower edges of the strip image T-n in the drawing depends on the position and the size of the area BP on the xy coordinate system.

In step S83, the partial-panoramic motion image generation section 63 aligns and stitches the partial strip images on the basis of the center coordinates of the partial strip image and the captured image, thereby generating the image data corresponding to one frame of the partial panoramic motion image, that is, generating the partial panoramic image.

At the time of stitching the partial strip images, similarly to the image stitching of the strip images, the edge portions of the partial strip image are subjected to weighted addition, thereby calculating the pixel values of the pixels of the partial panoramic image. In addition, in the generation of the partial panoramic image corresponding to one frame, the captured images of all frames of the processing targets are not used, but only the captured images of the predetermined number of successive frames depending on the size of the partial panoramic image are used.

In step S84, the partial-panoramic motion image generation section 63 determines whether or not the image data of the partial panoramic motion image corresponding to a predetermined number of the frames is generated. In step S84, if it is determined that the partial panoramic motion image corresponding to the predetermined number of the frames is not yet generated, the process returns to step S82, and the image data of the next frame of the partial panoramic motion image is generated.

When the image data subsequent to the second frame of the partial panoramic motion image is generated, similarly to the case of the panoramic motion image, the cut-out position of the partial strip image, which is cut out from the captured image, is shifted. In addition, the direction of shifting the cut-out position of the partial strip image and the width thereof are the same as the direction of shifting the cut-out position of the strip image and the width CW.

Figure 12:
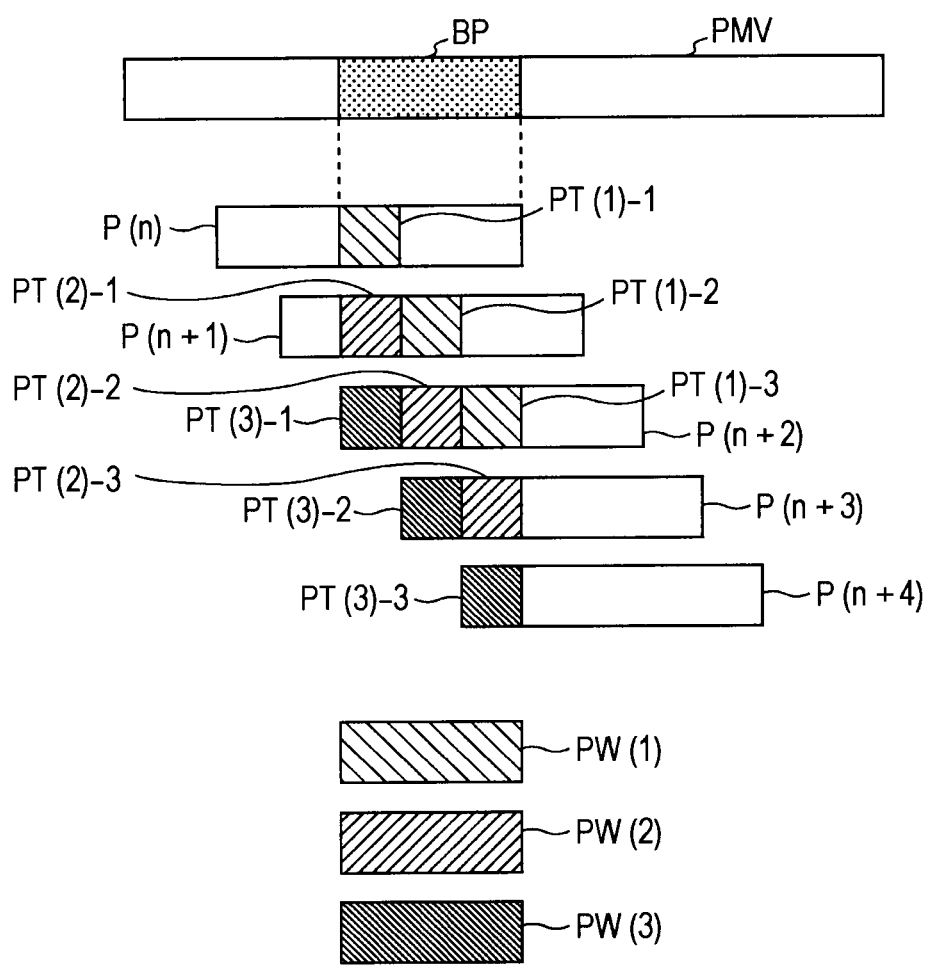
FIG. 12 is a diagram illustrating generation of the partial panoramic motion image.

As described above, while the cut-out position of the partial strip image is shifted for each frame, the image data of the frames of the partial panoramic motion image is generated, and thereby it is possible to obtain the partial panoramic motion image, for example, as shown in FIG. 12.

In addition, in FIG. 12, the elements corresponding to the case in FIG. 2 will be represented by the same reference numerals and signs, and description thereof will be omitted. In addition, in FIG. 12, the horizontal direction of the drawing corresponds to the horizontal direction of FIG. 9. For example, the horizontal direction of FIG. 12 corresponds to the x direction on the xy coordinate system.

In the example of FIG. 12, the partial strip images PT(1)-1 to PT(1)-3 are generated from the three captured images P(n) to P(n+2), and then the partial strip images are stitched. Thereby, it is possible to obtain a partial panoramic image PW(1).

Likewise, the partial strip images PT(2)-1 to PT(2)-3 are generated from the three captured images P(n+1) to P(n+3), and then the partial strip images are stitched. Thereby, it is possible to obtain a partial panoramic image PW(2). Further, the partial strip images PT(3)-1 to PT(3)-3 are generated from the three captured images P(n+2) to P(n+4), and then the partial strip images are stitched. Thereby, it is possible to obtain a partial panoramic image PW(3).

Here, the partial panoramic images PW(1) to PW(3) are images constituting the first to third frames of the partial panoramic motion image, respectively. Further, for example, the cut-out area of the partial strip image PT(2)-1 on the captured image P(n+1) is set as an area corresponding to the position of the cut-out area of the partial strip image PT(1)-2 shifted by the width CW in the left direction of the drawing.

Moreover, for example, the same subjects at different times are respectively displayed on the partial strip images PT(1)-1 to PT(3)-1.

In the partial panoramic images PW(1) to PW(3) obtained in such a manner, the subject included in the area BP on the panoramic motion image PMV, that is, the subjects on the partial panoramic images on which the same area on the image capturing space is displayed are different in terms of the image capture time.

Figure 11:
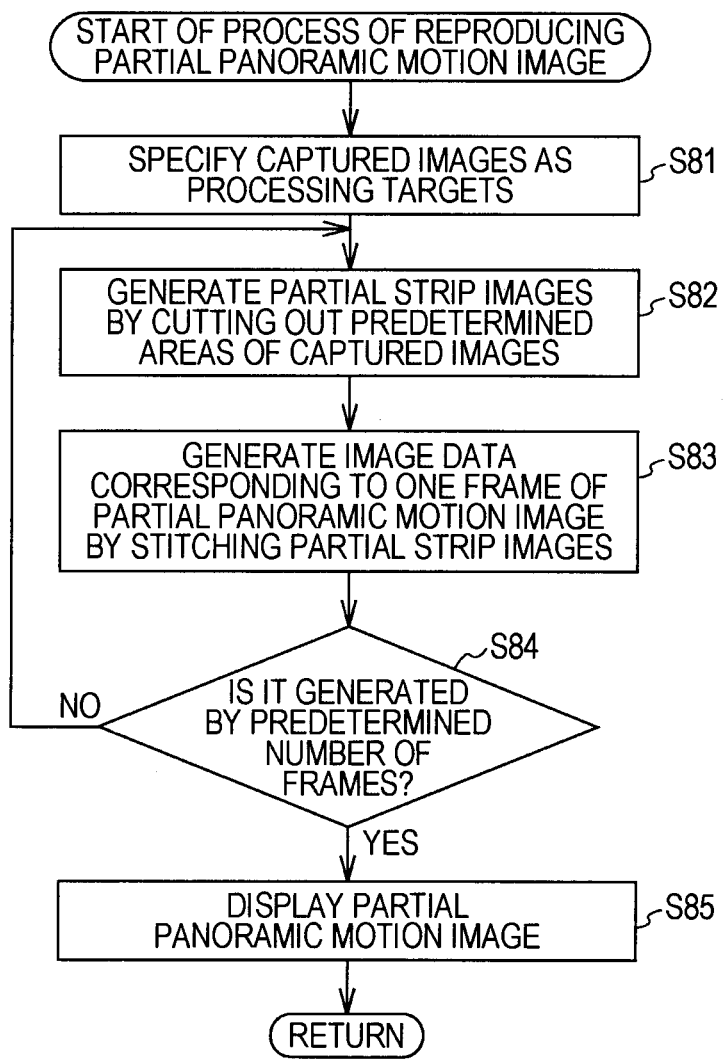
FIG. 11 is a flowchart illustrating a process of reproducing a partial panoramic motion image.

Returning to the description of the flowchart of FIG. 11, in step S84, if it is determined that the partial panoramic motion image corresponding to the predetermined number of the frames is generated, the partial-panoramic motion image generation section 63 supplies the generated partial panoramic motion image to the display control section 30. Thereafter, the process advances to step S85.

In step S85, the display control section 30 supplies the partial panoramic motion image from the partial-panoramic motion image generation section 63 to the display section 31, and displays the partial panoramic motion image. Consequently, the display control section 30 performs control to sequentially display the partial panoramic images constituting the partial panoramic motion image at a predetermined time interval.

Thereby, the display section 31 displays the motion image of the area which is designated by the user on the panoramic motion image. That is, the display section 31 displays the motion image in which the specific area of the image capturing space as the image capturing target is set as a subject at the time of the image capturing for obtaining the captured images. Accordingly, the user is able to more clearly observe the area by displaying the focused area on the panoramic motion image in an enlarged manner by displaying the partial panoramic image. When the partial panoramic motion image is reproduced, the process of reproducing the partial panoramic motion image ends. Then, the process of reproducing the motion image of FIG. 5 also ends.

As described above, the image capturing apparatus 11 stitches the plurality of partial strip images from captured images while shifting the cut-out area, thereby generating the partial panoramic images constituting the frames of the partial panoramic motion image.

By using the partial panoramic motion image which is generated in this manner, the subject, of which the image is captured, is made to have movement, and thereby the movement thereof can be displayed. Therefore, it is possible to more effectively display the captured image of the subject.

In addition, in the above description, the partial panoramic motion image is generated from the captured images. However, the partial panoramic motion image may be generated from the partial panoramic images of the frames by cutting the images of the area BP from the panoramic images of the frames of the generated panoramic motion image which is not reduced in size.

Description of Process of Reproducing Pan Motion Image

Next, with reference to the flowchart of FIG. 13, a process of reproducing a pan motion image corresponding to the process of step S20 of FIG. 5 will be described. The process of reproducing the pan motion image starts when a user designates a predetermined position on the panoramic motion image and issues an instruction to reproduce the pan motion image.

In step S111, the pan motion image generation section 64 specifies a captured image as a processing target among the captured images stored in the buffer memory 26 on the basis of a signal transmitted from the operation input unit 21.

Specifically, the pan motion image generation section 64 sets an area, which is centered on the position designated by the user and has a predetermined size, on the panoramic image. Then, the pan motion image generation section 64 specifies the frame n in which the position (the x coordinate) of one edge of the area on the xy coordinate system in the x direction is located at the boundary ML(C)-n. Here, the one edge of the area is defined as an edge in a direction opposite to the direction of moving the image capturing apparatus 11 on the panoramic image, for example, the left side edge of FIG. 2. The pan motion image generation section 64 sets the captured images from the frame n to the specified frame (n+β) as the processing targets. For example, β depends on the size of the area on the panoramic image displayed as one pan image.

In step S112, the supplementing portion 74 reads out the captured images of the frames set as the processing targets from the buffer memory 26, and supplements the readout captured images. Consequently, a predetermined number of the captured images are supplemented between the successive frames.

Figure 14:
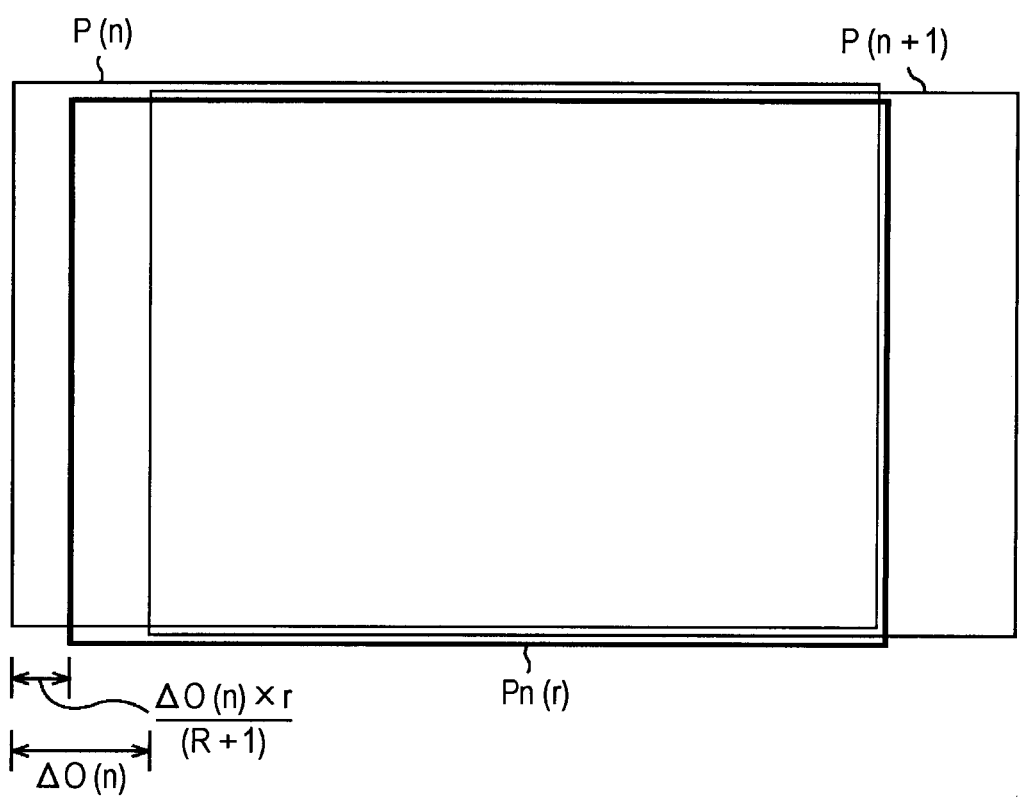
FIG. 14 is a diagram illustrating supplementation of the captured images.

For example, as shown in FIG. 14, between the captured images P(n) and P(n+1), R captured images Pn(1) to Pn(R), which are new, are inserted by the supplementation. In FIG. 14, the captured images P(n) and P(n+1) are aligned on the xy coordinate system on the basis of the center coordinates. Further, in the example of FIG. 14, the y coordinates of the center coordinates of the captured images P(n) and P(n+1) are set to be the same.

At this time, the distance from the center of the captured image P(n) to the center of the captured image P(n+1) is represented as ΔO(n). Further, the captured image of the frame, which is an r-th (here, 1≤r≤R) frame from the frame n, among the supplemented captured images is represented as a captured image Pn(r). In this case, the area of the captured image P(n) from the position, distant (ΔO(n)×r)/(R+1) from the left edge of the captured image P(n) in the drawing, to the right edge of the captured image P(n) is directly set as the captured image Pn(r).

That is, the position from the left edge of the captured image P(n) to the left edge of the captured image P(n+1) in the drawing is equally divided into (R+1). Then, the areas of the captured image P(n) from the respective positions, which are equally divided, to the position of the right edge of the captured image P(n) in the drawing are directly set as the captured images Pn(1) to Pn(R).

Further, even on the xy coordinate system, the captured image Pn(r) is disposed so as to overlap with the area of the captured image P(n) set as the captured image Pn(r). In addition, the center coordinates of the captured image Pn(r) are set by adding (ΔO(n)×r)/(R+1) to the x coordinate of the center coordinates of the captured image P(n).

As described above, by supplementing the captured images, it is possible to increase in practical terms the frame rate of the pan motion image. Thereby, it is possible to move the subject more smoothly on the pan motion image, and thus it is also possible to improve the pan motion image quality.

Figure 13:
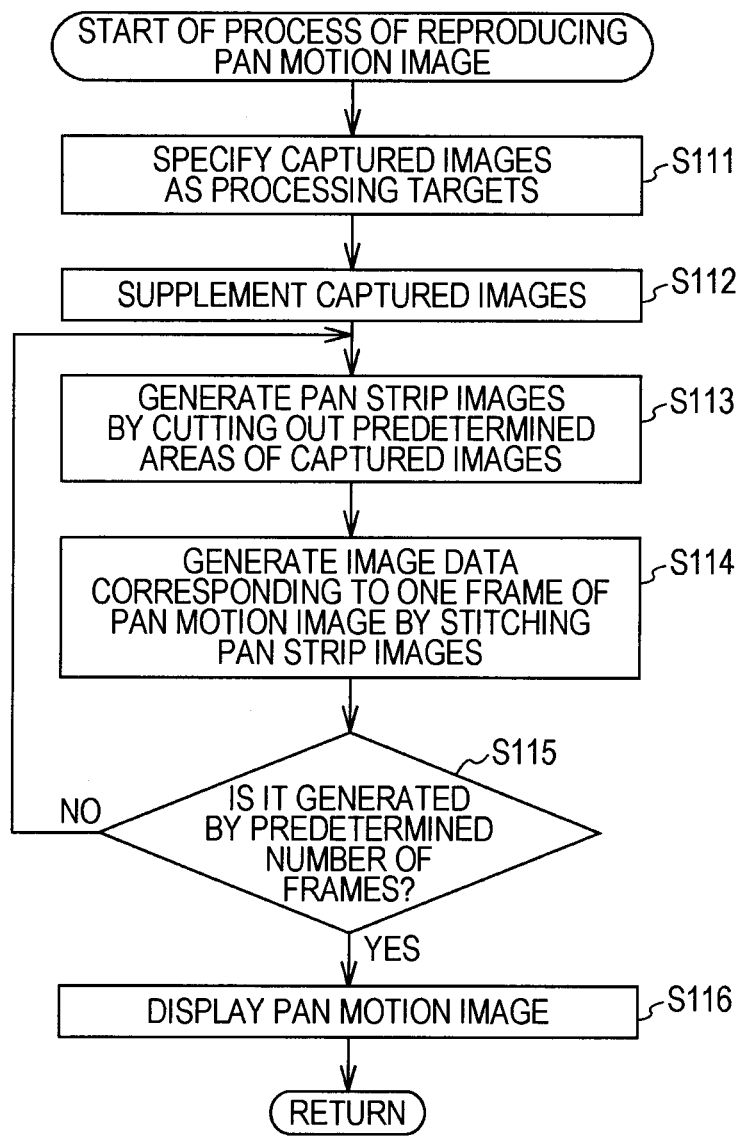
FIG. 13 is a flowchart illustrating a process of reproducing a pan motion image.

Returning to the description of the flowchart of FIG. 13, when the captured images of the processing targets are supplemented, the pan motion image generation section 64 reassigns the frame numbers to the supplemented captured images, respectively.

In step S113, the pan strip image generation portion 75 generates the pan strip images by cutting out predetermined areas of the captured images on the basis of the supplemented captured images of the processing targets and the center coordinates of the capture images.

For example, a partial area of the strip image T-n of FIG. 9 is cut out from the captured image P(n) of the frame n as the pan strip image used in generation of the first frame of the pan motion image. Specifically, the width of the area set as the pan strip image in the horizontal direction of FIG. 9 is the same as that of the strip image T-n. In addition, the distance between the respective edges of the pan strip image in the vertical direction, that is, the distance between the upper and lower edges of the strip image T-n in FIG. 9 depends on the position and the size of the area, which is intended to be displayed as a pan motion image, on the panoramic image.

In step S114, the pan motion image generation section 64 aligns and stitches the pan strip images on the basis of the center coordinates of the pan strip image and the captured image, thereby generating the image data corresponding to one frame of the pan motion image, that is, generating one pan image.

At the time of stitching the pan strip images, similarly to the image stitching of the strip images, the edge portions of the pan strip image are subjected to the weighted addition, thereby calculating the pixel values of the pixels of the pan image.

In step S115, the pan motion image generation section 64 determines whether or not the image data of the pan motion image corresponding to a predetermined number of the frames is generated. In step S115, if it is determined that the pan motion image corresponding to the predetermined number of the frames is not yet generated, the process returns to step S113, and the image data of the next frame of the pan motion image is generated.

When the image data subsequent to the second frame of the pan motion image is generated, similarly to the case of the panoramic motion image, the cut-out position of the pan strip image, which is cut out from the captured image, is shifted. In addition, the direction of shifting the cut-out position of the pan strip image and the width thereof are the same as the direction of shifting the cut-out position of the strip image and the width CW. However, the direction of shifting the cut-out position of the pan strip image is set as the direction opposite to the direction of shifting the cut-out position of the strip image.

Figure 15:
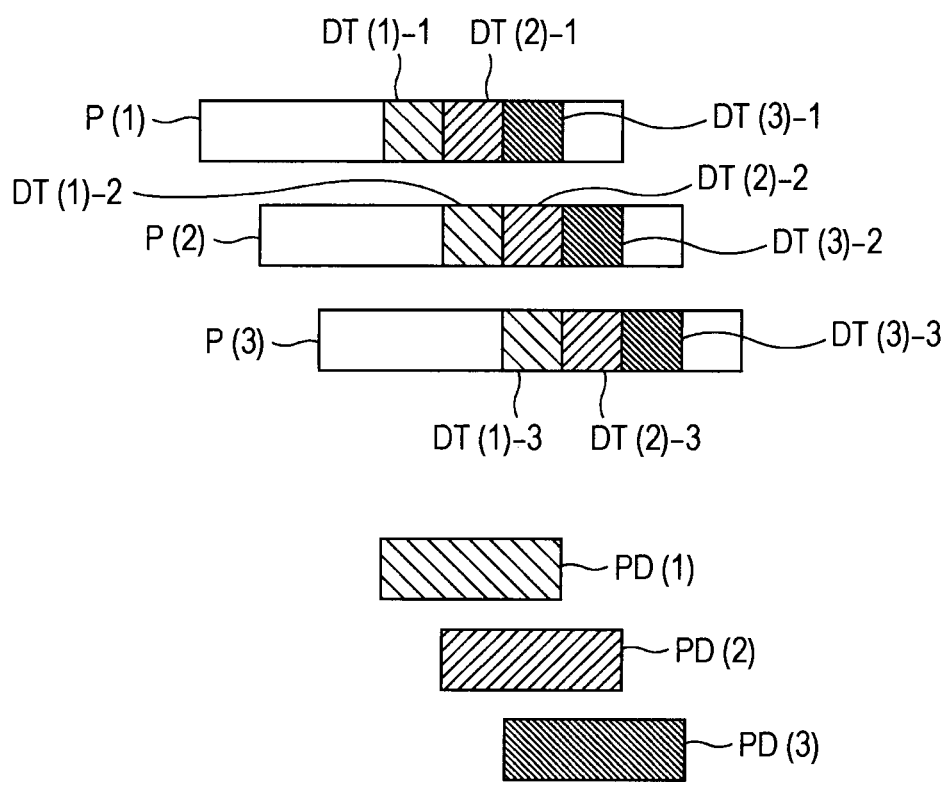
FIG. 15 is a diagram illustrating generation of the pan motion image.

As described above, while the cut-out position of the pan strip image is shifted for each frame, the image data of the frames of the pan motion image is generated, and thereby it is possible to obtain the pan motion image, for example, as shown in FIG. 15.

In addition, in FIG. 15, the horizontal direction of the drawing corresponds to the horizontal direction of FIG. 9. For example, the horizontal direction of FIG. 15 corresponds to the x direction on the xy coordinate system.

In the example of FIG. 15, the pan strip images DT(1)-1 to DT(1)-3 are generated from the three captured images P(1) to P(3), and then the pan strip images are stitched. Thereby, it is possible to obtain a pan image PD(1).

Likewise, the pan strip images DT(2)-1 to DT(2)-3 are generated from the three captured images P(1) to P(3), and then the pan strip images are stitched. Thereby, it is possible to obtain a pan image PD(2). Further, the pan strip images DT(3)-1 to DT(3)-3 are generated from the three captured images P(1) to P(3), and then the pan strip images are stitched. Thereby, it is possible to obtain a pan image PD(3).

Here, the pan images PD(1) to PD(3) are images constituting the first to third frames of the pan motion image, respectively. Further, for example, the cut-out area of the pan strip image DT(2)-1 on the captured image P(1) is set as an area corresponding to the position of the cut-out area of the pan strip image DT(1)-1 shifted by the width CW in the right direction of the drawing.

Moreover, for example, the same subjects at different times are respectively displayed on the pan strip images DT(1)-3 to DT(3)-1.

In the pan images PD(1) to PD(3) obtained in such a manner, a part of the area in the specific range on the image capturing space as the image capturing target is displayed at the time of the image capturing for obtaining the N captured images. Further, the position of the area on the image capturing space displayed as a subject in each pan image is deviated in the direction of turning the image capturing apparatus 11 at the image capture time for each frame of the pan motion image.

Returning to the description of the flowchart of FIG. 13, in step S115, if it is determined that the pan motion image corresponding to the predetermined number of the frames is generated, the pan motion image generation section 64 supplies the generated pan motion image to the display control section 30. Thereafter, the process advances to step S116.

In step S116, the display control section 30 supplies the pan motion image from the pan motion image generation section 64 to the display section 31, and displays the pan motion image. Consequently, the display control section 30 performs control in order to sequentially display the pan images constituting the pan motion image at a predetermined time interval.

Thereby, the display section 31 displays the areas in the predetermined range on the panoramic motion image while the area is panned from the area, which is designated by the user, in a specific direction (the direction of moving the image capturing apparatus 11). That is, the areas in the predetermined range on the image capturing space, which is set as the image capturing target at the time of the image capturing for obtaining the captured images, are sequentially displayed while being scrolled from one edge to the other edge of each area in the predetermined range, thereby reproducing the motion image. When the pan motion image is reproduced, the process of reproducing the pan motion image ends. Then, the process of reproducing the motion image of FIG. 5 also ends.

As described above, the image capturing apparatus 11 stitches the plurality of pan strip images from captured images while shifting the cut-out area, thereby generating the pan images constituting the frames of the pan motion image. By using the pan motion image which is generated in this manner, the subject, of which the image is captured, is made to have movement, and thereby the movement thereof can be displayed. Therefore, it is possible to more effectively display the captured image of the subject. Moreover, the area set as a subject is displayed while being panned, and thus it is possible to provide more interesting images.

Description of Process of Reproducing Subject-Tracking Motion Image

Figure 16:
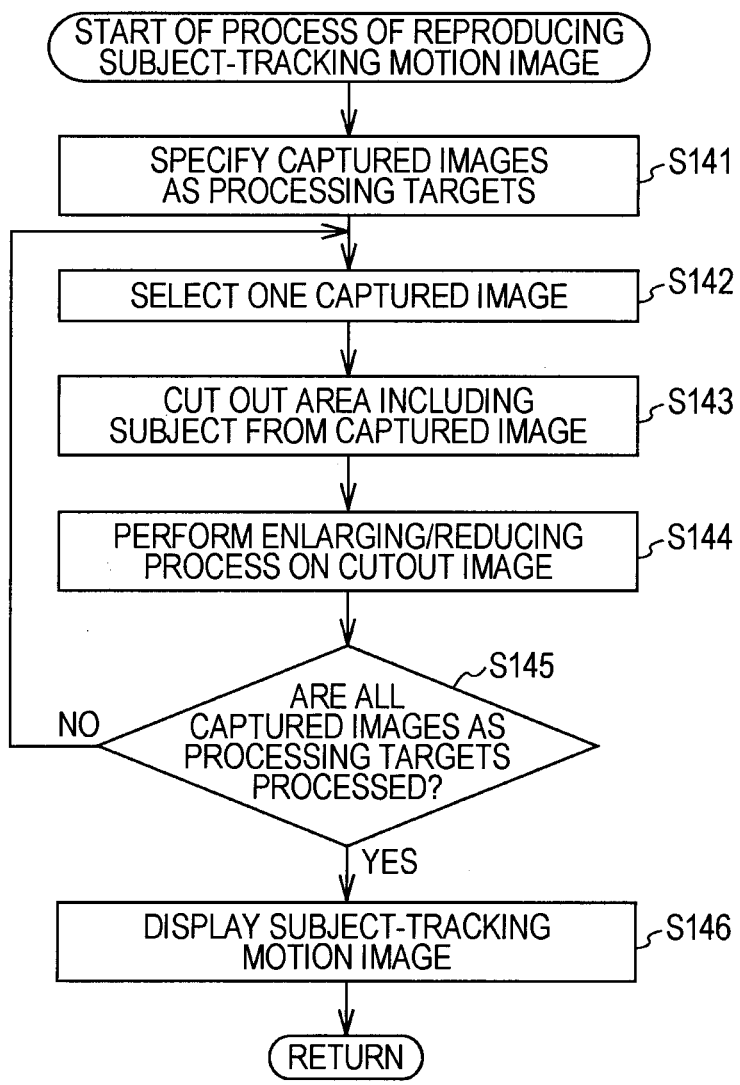
FIG. 16 is a flowchart illustrating a process of reproducing a subject-tracking motion image.

Next, with reference to the flowchart of FIG. 16, a process of reproducing a subject-tracking motion image corresponding to the process of step S22 of FIG. 5 will be described. The process of reproducing the subject-tracking motion image starts when a user designates a moving subject on the panoramic motion image and issues an instruction to reproduce the subject-tracking motion image.

In step S141, the specifying portion 76 of the subject-tracking motion image generation section 65 specifies a captured image as a processing target among the captured images stored in the buffer memory 26 on the basis of a signal transmitted from the operation input unit 21.

For example, by using the displayed panoramic motion image, the specifying portion 76 sets, as processing targets, the captured images, which include the subject designated by the user, among the captured images stored in the buffer memory 26. The captured images, which are set as the processing targets, are captured images of the plurality of successive frames. For example, the detection of the captured images including the designated subject are performed by calculating differences between each area of the captured images and the area including the designated subject on the panoramic motion image.

In step S142, the subject-tracking motion image generation section 65 selects one of the captured images set as the processing targets. Specifically, the captured image of the oldest frame number is selected from the captured images of the processing targets which are not yet selected.

In step S143, the subject-tracking motion image generation section 65 cuts out the area, which includes the subject designated by the user, from the selected captured image, and sets the cut-out area as a cut-out image.

For example, by positioning the center of the designated subject at the center of the captured image, an image of the area surrounding the entire subject is set as the cut-out image. Accordingly, the cut-out image inevitably includes the designated subject, and thus the center of the subject is positioned at the center of the cut-out image. As described above, by cutting out the area, which is centered on the center position of the subject, as the cut-out image, the subject can generally be displayed at substantially the center of the screen at the time of reproducing the subject-tracking motion image.

In step S144, the subject-tracking motion image generation section 65 performs an enlarging/reducing process on the generated cut-out image if necessary, and sets the cut-out image as an image with a predetermined size. Consequently, the cut-out image is enlarged or reduced so that the entire cut-out image has the predetermined size.

The reason for this is that the size of the cut-out image, which is generated from the captured image, is not typically the same, since the distance between the designated subject on the image capturing space and the image capturing apparatus 11 is changed by the frame of the captured image.

In step S145, the subject-tracking motion image generation section 65 determines whether or not all the captured images of the processing targets are processed, that is, whether or not the cut-out image is generated from all the captured images.

In step S145, if it is determined that all the captured images are not yet processed, the process returns to step S142, and the above-mentioned process is repeated. That is, the next captured image is selected, and thus the cut-out image is generated from the captured image.

In contrast, in step S145, if it is determined that all the captured images are processed, the subject-tracking motion image generation section 65 supplies the image group, which is generated from the obtained cut-out images, as the subject-tracking motion image to the display control section 30. When the display control section 30 is supplied with the subject-tracking motion image, then, the process advances to step S146.

In step S146, the display control section 30 supplies the subject-tracking motion image from the subject-tracking motion image generation section 65 to the display section 31, and displays the subject-tracking motion image. That is, the display control section 30 performs control to sequentially display the cut-out images constituting the subject-tracking motion image at a predetermined time interval.

Thereby, the display section 31 displays the predetermined moving subject on the panoramic motion image in an enlarged manner. Since the subject-tracking motion image is the motion image mostly displayed at the center of the screen, the user is able to more clearly observe the subject by displaying the focused subject on the panoramic motion image in an enlarged manner by displaying the subject-tracking motion image.

When the subject-tracking motion image is reproduced, the process of reproducing the subject-tracking motion image ends. Then, the process of reproducing the motion image of FIG. 5 also ends.

As described above, the image capturing apparatus 11 generates the cut-out images of the frames constituting the subject-tracking motion image by cutting out the areas of the subject from the captured images. By using the subject-tracking motion image generated in such a manner, it is possible to more clearly observe the subject by way of enlarging the focused subject on the panoramic motion image.

The above-mentioned series of processes may be performed by hardware, and may be performed by software. When the series of the processes are performed by software, programs constituting the software are installed from a program storage medium on a computer into which is built dedicated hardware, for example, a general personal computer which is capable of performing various functions by installing various programs, or the like.

Figure 17:
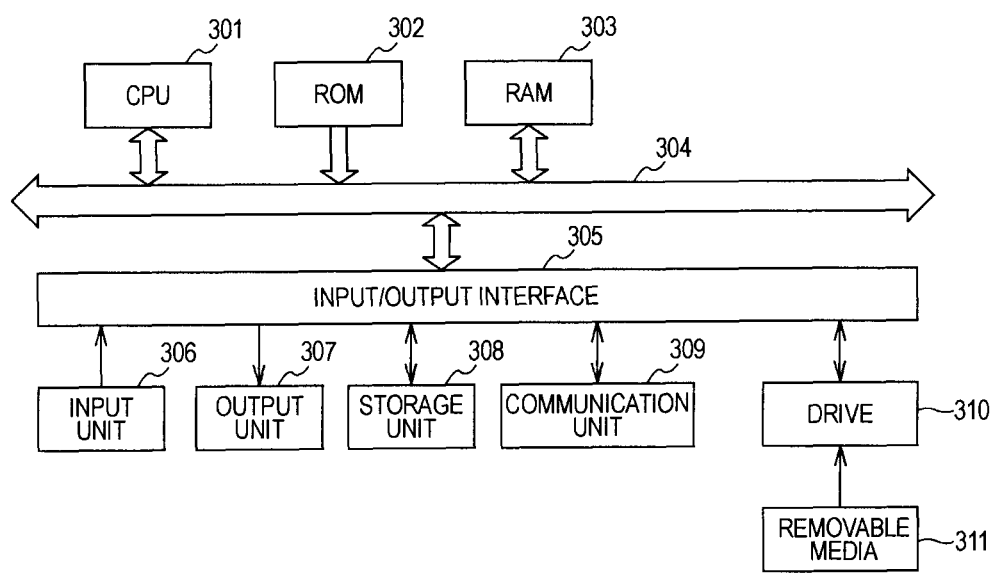
FIG. 17 is a diagram illustrating an exemplary configuration of a computer.

FIG. 17 is a block diagram illustrating an exemplary configuration of the hardware of a computer that causes a program to perform the above-mentioned series of the processes.

In the computer, a CPU (Central Processing Unit) 301, a ROM (Read Only Memory) 302, and a RAM (Random Access Memory) 303 are connected to each other through a bus 304.

The bus 304 is further connected with the input/output interface 305. The input/output interface 305 is connected with: an input unit 306 formed of a keyboard, a mouse, a microphone, and the like; an output unit 307 formed of a display, a speaker, and the like; a storage unit 308 formed of a hard disc, a non-volatile memory, and the like; a communication unit 309 formed of a network interface and the like; and a drive 310 that drives removable media 311 such as a magnetic disc, an optical disc, a magneto optical disc, and a semiconductor memory.

In the computer configured as described above, the CPU 301 loads the program stored in the storage unit 308 on the RAM 303 through the input/output interface 305 and the bus 304 and executes the program, thereby performing the above-mentioned series of the processes.

The program executed by the computer (the CPU 301) is stored in the removable media 311 which are package media formed of, for example, a magnetic disc (including flexible disc), an optical disc (CD-ROM (Compact Disc-Read Only Memory), a DVD (Digital Versatile Disc or the like), a magneto-optical disc, a semiconductor memory, and the like.

Alternatively, the program is provided through wired or wireless transmission media such as a local area network, the Internet, digital satellite broadcasting, and the like.

In addition, the program may be installed in the storage unit 308 through the input/output interface 305 by mounting the removable medium 311 in the drive 310. Further, the program may be installed in the storage unit 308 by allowing the communication unit 309 to receive the program through the wired or wireless transmission media. Otherwise, the program may be stored in the ROM 302 or the storage unit 308 in advance.

In addition, the program executed by the computer may be a program that performs the processes chronologically in order of the above-mentioned description, and may be a program that performs the processes in parallel, or as necessary when called up, or the like.

The present application contains subject matter related to that disclosed in Japanese Priority Patent Application JP 2009-235401 filed in the Japan Patent Office on Oct. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging processing device comprising:

position information generation means for, on the basis of a plurality of captured images which are sequentially obtained through image capturing by image capturing means while the image capturing means is moved, generating position information which represents a relative positional relationship of the captured images when the plurality of the captured images are aligned on a predetermined plane so as to overlap same subjects, which are included in the different captured images, with each other;

strip image generation means for, for each of the plurality of the captured images, cutting out an area on the captured image from a predetermined reference position on the captured image to the reference position on another captured image which is aligned on the plane so as to overlap with the captured image and generating a strip image including the area, when the plurality of the captured images are aligned on the plane on the basis of the position information; and panoramic image generation means for generating a panoramic image by aligning and stitching the strip images which are obtained from the plurality of the captured images, the panoramic image depicting an image field larger than any single one of the plurality of captured images, wherein the strip image generation means generates a plurality of the strip images from the captured images while shifting the areas on the captured images in a predetermined direction relative to the plurality of the captured images, and wherein the panoramic image generation means generates an image group formed of a plurality of ordered panoramic images, each panoramic image depicting the same image field and, wherein, for each portion of the image field comprising strips in the plurality of panoramic images, the sequence of the ordered panoramic images depicts the portion of the image field as sequentially captured during image capturing.

2. The image processing device according to claim 1, wherein when stitching the strips, the panoramic generation means determines pixel values for pixels in the vicinity of edges of the strips by weighted addition.

3. The image processing device according to claim 1, further comprising display control means for sequentially displaying the plurality of the panoramic images at a predetermined time interval.

4. The image processing device according to claim 3, further comprising:
  specifying means for, when a moving subject on the panoramic image is designated, specifying the captured image including the moving subject among the plurality of the captured images; and
  cut-out-image generation means for, for each of the plurality of the captured images specified by the specifying means, forming a cut-out image by cutting out an area including the moving subject from the captured image, and generating a group of a plurality of cut-out images,
  wherein the display control means sequentially displays the plurality of the cut-out images at a predetermined time interval.

5. The image processing device according to claim 4, further comprising detection means for, on the basis of the panoramic images successively displayed, detecting the moving subject from the panoramic images,
  wherein the display control means displays the area including the moving subject in each panoramic image in a different display format from other areas of each panoramic image when sequentially displaying the plurality of the panoramic images.

6. The image processing device according to claim 3, wherein the display control means is configured to sequentially display the plurality of the panoramic images such that each area of a predetermined range of the image field is displayed in order from one end to another end.

7. The image processing device according to claim 1, wherein by use of a plurality of block areas set on the captured images in advance, the position information generation means generates the position information by respectively searching block correspondence areas corresponding to the plurality of the block areas from captured images obtained at an earlier time than the captured images.

8. The image processing device according to claim 7, wherein the position information generation means detects the block area including a moving subject on the basis of a relative positional relationship of the plurality of the block areas and a relative positional relationship of a plurality of the block correspondence areas, and when the block area including the moving subject is detected, generates the position information by searching the block correspondence areas by use of the block areas, which are different from the detected block area, among the plurality of the block areas.

9. An image processing method of an image processing device including position information generation means for, on the basis of a plurality of captured images which are sequentially obtained through image capturing by image capturing means while the image capturing means is moved, generating position information which represents a relative positional relationship of the captured images when the plurality of the captured images are aligned on a predetermined plane so as to overlap same subjects, which are included in the different captured images, with each other, strip image generation means for, for each of the plurality of the captured images, cutting out an area on the captured image from a predetermined reference position on the captured image to the reference position on another captured image which is aligned on the plane so as to overlap with the captured image and generating a strip image including the area when the plurality of the captured images are aligned on the plane on the basis of the position information, and panoramic image generation means for generating a panoramic image by aligning and stitching the strip images which are obtained from the plurality of the captured images, the panoramic image depicting an image field larger than any single one of the plurality of captured images, the image processing method comprising the steps of:
  generating the position information from the plurality of the captured images, by means of the position information generation means,
  generating a plurality of the strip images from the captured images while shifting the areas on the captured images in a predetermined direction relative to the plurality of the captured images, by means of the strip image generation means, and
  generating an image group formed of a plurality of ordered panoramic images, each panoramic image depicting the same image field and, wherein, for each portion of the image field comprising strips in the plurality of panoramic images, the sequence of the ordered panoramic images depicts the portion of the image field as sequentially captured during image capturing, by means of the panoramic image generation means.

10. A non-transitory, computer-readable storage medium storing a program that, when executed by a processor, causes the processor to execute a process comprising:
  a position information generation step of, on the basis of a plurality of captured images which are sequentially obtained through image capturing by image capturing means while the image capturing means is moved, generating position information which represents a relative positional relationship of the captured images when the plurality of the captured images are aligned on a predetermined plane so as to overlap same subjects, which are included in the different captured images, with each other;
  a strip image generation step of, for each of the plurality of the captured images, cutting out an area on the captured image from a predetermined reference position on the captured image to the reference position on another captured image which is aligned on the plane so as to overlap with the captured image and generating a strip image including the area, when the plurality of the captured images are aligned on the plane on the basis of the position information; and
  a panoramic image generation step of generating a panoramic image by aligning and stitching the strip images which are obtained from the plurality of the captured images, the panoramic image depicting an image field larger than any single one of the plurality of captured images,
  wherein in the strip image generation step, a plurality of the strip images are generated from the captured images while the areas on the captured images are deviated in a predetermined direction relative to the plurality of the captured images, and
  wherein in the panoramic image generation step, an image group formed of a plurality of ordered panoramic images, each panoramic image depicting the same image field and, wherein, for each portion of the image field comprising strips in the plurality of panoramic images, the sequence of the ordered panoramic images depicts the portion of image field as sequentially captured during image capturing.

11. An imaging processing device comprising:
a position information generation section that, on the basis of a plurality of captured images which are sequentially obtained through image capturing by an image capturing section while the image capturing section is moved, generates position information which represents a relative positional relationship of the captured images when the plurality of the captured images are aligned on a predetermined plane so as to overlap same subjects, which are included in the different captured images, with each other;
a strip image generation section that, for each of the plurality of the captured images, cuts out an area on the captured image from a predetermined reference position on the captured image to the reference position on another captured image which is aligned on the plane so as to overlap with the captured image and generates a strip image including the area, when the plurality of the captured images are aligned on the plane on the basis of the position information; and
a panoramic image generation section that generates a panoramic image by aligning and stitching the strip images which are obtained from the plurality of the captured images, the panoramic image depicting an image field larger than any single one of the plurality of captured images,
wherein the strip image generation section generates a plurality of the strip images from the captured images while shifting the areas on the captured images in a predetermined direction relative to the plurality of the captured images, and
wherein the panoramic image generation section generates an image group formed of a plurality of ordered panoramic images, each panoramic image depicting the same image field and, wherein, for each portion of the image field comprising strips in the plurality of panoramic images, the sequence of the ordered panoramic images depicts the portion of the image field as sequentially captured during image capturing.

12. An image processing method of an image processing device including a position information generation section that, on the basis of a plurality of captured images which are sequentially obtained through image capturing by an image capturing section while the image capturing section is moved, generates position information which represents a relative positional relationship of the captured images when the plurality of the captured images are aligned on a predetermined plane so as to overlap same subjects, which are included in the different captured images, with each other, a strip image generation section that, for each of the plurality of the captured images, cuts out an area on the captured image from a predetermined reference position on the captured image to the reference position on another captured image which is aligned on the plane so as to overlap with the captured image, and generates a strip image including the area, when the plurality of the captured images are aligned on the plane on the basis of the position information, and a panoramic image generation section that generates a panoramic image by aligning and stitching the strip images which are obtained from the plurality of the captured images, the panoramic image depicting an image field larger than any single one of the plurality of captured images, the image processing method comprising the steps of:
generating the position information from the plurality of the captured images, by means of the position information generation section,
generating a plurality of the strip images from the captured images while shifting the areas on the captured images in a predetermined direction relative to the plurality of the captured images, by means of the strip image generation section, and
generating an image group formed of a plurality of ordered panoramic images, each panoramic image depicting the same image field and, wherein, for each portion of the image field comprising strips in the plurality of panoramic images, the sequence of the ordered panoramic images depicts the portion of the image field as sequentially captured during image capturing, by means of the panoramic image generation means.

13. A non-transitory, computer-readable storage medium storing a program that, when executed by a processor, causes the processor to execute a process comprising:
a position information generation step of, on the basis of a plurality of captured images which are sequentially obtained through image capturing by an image capturing section while the image capturing section is moved, generating position information which represents a relative positional relationship of the captured images when the plurality of the captured images are aligned on a predetermined plane so as to overlap same subjects, which are included in the different captured images, with each other;
a strip image generation step of, for each of the plurality of the captured images, cutting out an area on the captured image from a predetermined reference position on the captured image to the reference position on another captured image which is aligned on the plane so as to overlap with the captured image and generating a strip image including the area, when the plurality of the captured images are aligned on the plane on the basis of the position information; and
a panoramic image generation step of generating a single panoramic image by aligning and stitching the strip images which are obtained from the plurality of the captured images, the panoramic image depicting an image field larger than any single one of the plurality of captured images,
wherein in the strip image generation step, a plurality of the strip images are generated from the captured images while the areas on the captured images are shifted in a predetermined direction relative to the plurality of the captured images, and
wherein in the panoramic image generation step, an image group formed of a plurality of ordered panoramic images, each panoramic image depicting the same image field and, wherein, for each portion of the image field comprising strips in the plurality of panoramic images, the sequence of the ordered panoramic images depicts the portion of the image field as sequentially captured during image capturing.

* * * * *